(12) United States Patent
Kang et al.

(10) Patent No.: US 10,841,529 B2
(45) Date of Patent: Nov. 17, 2020

(54) MOBILE TERMINAL ADJUSTING IMAGE QUALITY OF DISPLAY, AND METHOD OF OPERATING THE SAME

(71) Applicant: SAMSUNG ELECTRONICS CO., LTD., Suwon-si (KR)

(72) Inventors: Hyun Kang, Suwon-si (KR); Wanhee Chun, Suwon-si (KR); Sungwon Kang, Suwon-si (KR); Dukho Do, Suwon-si (KR); Namwoo Park, Suwon-si (KR); Bongsic Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/422,438

(22) Filed: May 24, 2019

(65) Prior Publication Data

US 2019/0373206 A1    Dec. 5, 2019

Related U.S. Application Data

(60) Provisional application No. 62/680,917, filed on Jun. 5, 2018.

(30) Foreign Application Priority Data

Jan. 31, 2019   (KR) .................... 10-2019-0012820

(51) Int. Cl.
*H04N 5/57* (2006.01)
*G06F 3/14* (2006.01)
*H04N 17/02* (2006.01)

(52) U.S. Cl.
CPC ............ *H04N 5/57* (2013.01); *G06F 3/1446* (2013.01); *H04N 17/02* (2013.01)

(58) Field of Classification Search
CPC ... G09G 2320/0242; G09G 2320/0693; G09G 2320/08; G09G 3/006; G09G 2370/04;
(Continued)

(56) References Cited

U.S. PATENT DOCUMENTS 9,483,849 B2   11/2016 Choi et al.
10,121,418 B2  11/2018 Beon et al.
(Continued)

FOREIGN PATENT DOCUMENTS

KR   10-2014-0126606 A   10/2014
KR   10-2016-0064900 A    6/2016
(Continued)

OTHER PUBLICATIONS

International Search Report (PCT/ISA/210) and Written Opinion (PCT/ISA/237) dated Sep. 5, 2019 issued by the International Searching Authority in International Application No. PCT/KR2019/006246.

*Primary Examiner* — Muhammad N Edun
(74) *Attorney, Agent, or Firm* — Sughrue Mion, PLLC

(57) ABSTRACT

Provided is a mobile terminal including a communicator configured to communicate with a display, the display comprising a plurality of panels and being configured to output optical information; an image capturing device configured to obtain an image of the display; and a processor configured to compensate the obtained image using a response characteristic of the image capturing device, and generate, using the compensated image, an adjustment signal to adjust the output of the optical information, wherein the communicator is further configured to transmit the adjustment signal to the display to permit the display to adjust the output of the optical information.

20 Claims, 9 Drawing Sheets

(58) Field of Classification Search
CPC ........ G09G 2320/0606; G09G 2370/06; G06F 3/1446; H04N 5/57; H04N 17/02
See application file for complete search history.

(56) References Cited

U.S. PATENT DOCUMENTS

| | | |
|---|---|---|
| 2005/0052544 A1* | 3/2005 | Tsai .................. H04N 5/23241 348/223.1 |
| 2013/0120589 A1 | 5/2013 | Chang et al. |
| 2015/0138221 A1 | 5/2015 | Choi et al. |
| 2018/0342224 A1 | 11/2018 | Beon et al. |
| 2019/0052872 A1* | 2/2019 | Shyshkin ............... H04N 17/04 |
| 2019/0226997 A1* | 7/2019 | Nitikin ............... G01N 21/8806 |

FOREIGN PATENT DOCUMENTS

| | | |
|---|---|---|
| KR | 10-2017-0025302 A | 3/2017 |
| KR | 10-2017-0035527 A | 3/2017 |
| KR | 10-2018-0003720 A | 1/2018 |
| KR | 10-2018-0042030 A | 4/2018 |

\* cited by examiner

1010

1020

1030

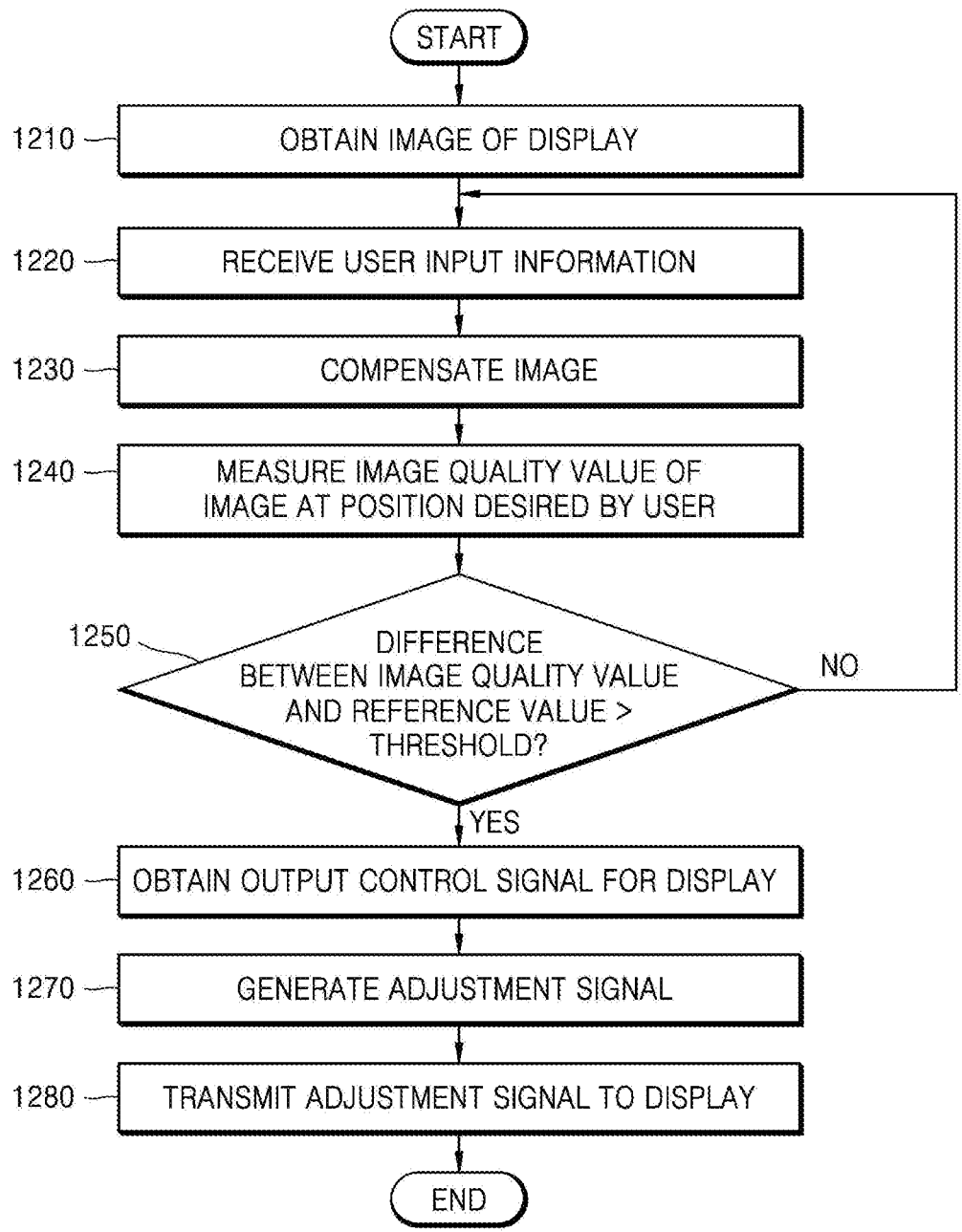

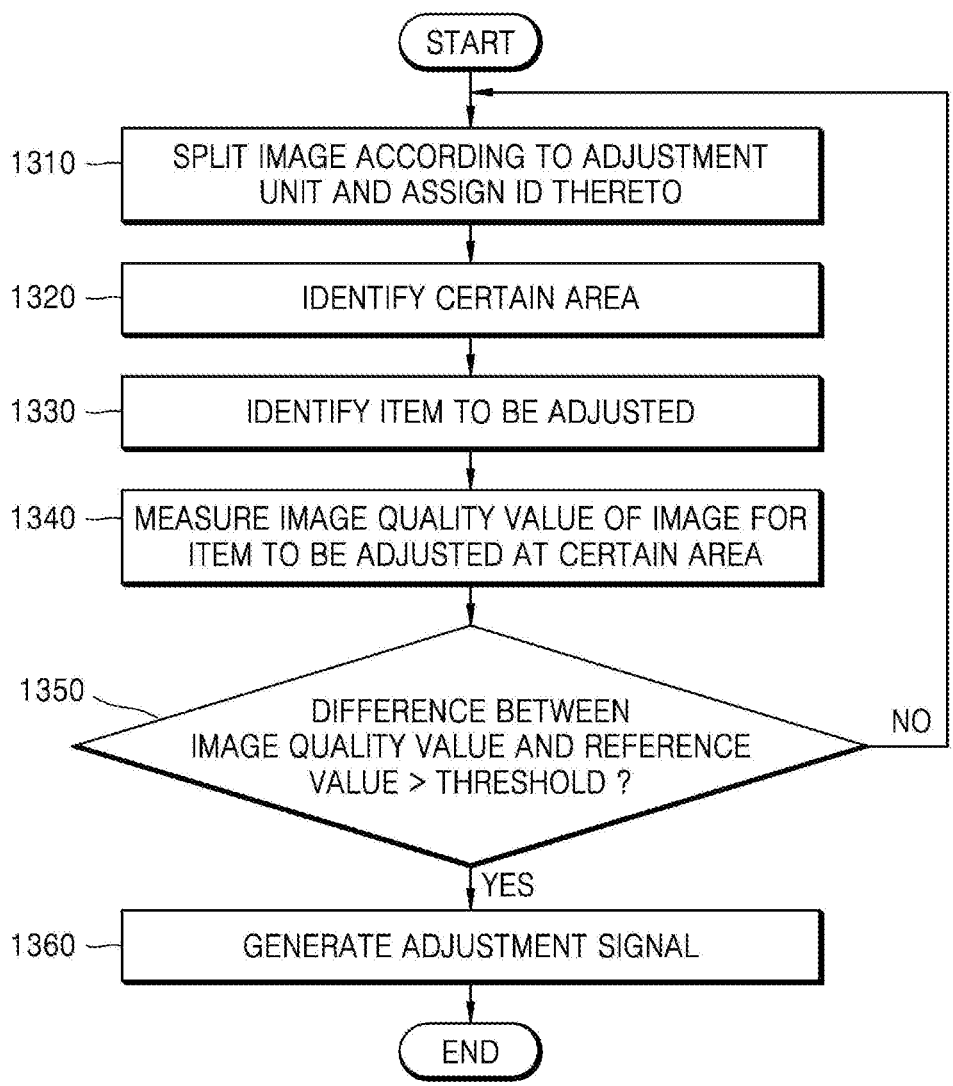

MOBILE TERMINAL ADJUSTING IMAGE QUALITY OF DISPLAY, AND METHOD OF OPERATING THE SAME

CROSS-REFERENCE TO RELATED APPLICATION(S)

This application is based on and claims priority under 35 U.S.C. § 119 to U.S. Provisional Patent Application No. 62/680,917 filed on Jun. 5, 2018, in the United States Patent and Trademark Office, and Korean Patent Application No. 10-2019-0012820, filed on Jan. 31, 2019, in the Korean Intellectual Property Office, the disclosures of which are incorporated by reference herein in their entireties.

BACKGROUND

1. Field

The disclosure relates to a mobile terminal configured to adjust an image quality of a display, and a method of operating the same, and more particularly, to a mobile terminal configured to compensate a captured image of a display and adjust an image quality of the display using the compensated image, and a method of operating the same.

2. Description of Related Art

A video wall apparatus is an apparatus including a plurality of displays used as a single integrated display. The video wall apparatus includes a plurality of panels constituting a large screen. For example, a light-emitting diode (LED) display apparatus may be configured as one large display apparatus by assembling a plurality of LED cabinets. Such a display apparatus includes a plurality of panels each having unique brightness and color, and thus the panels of the display apparatus may have variations in brightness and color.

Professional equipment including image-based professional measurement equipment may be used to adjust the image quality of multiple panels. However, such equipment is expensive and difficult to use at a site of installation.

SUMMARY

Provided are a method of adjusting image quality of a display including a plurality of panels, performed by a mobile terminal, and a mobile terminal performing the method.

Additional aspects will be set forth in part in the description which follows and, in part, will be apparent from the description, or may be learned by practice of the presented embodiments of the disclosure.

According to an embodiment of the disclosure, a mobile terminal includes a communicator configured to communicate with a display, the display comprising a plurality of panels and being configured to output optical information; an image capturing device configured to obtain an image of the display; and a processor configured to compensate the obtained image using a response characteristic of the image capturing device, and generate, using the compensated image, an adjustment signal to adjust the output of the optical information, wherein the communicator is further configured to transmit the adjustment signal to the display to permit the display to adjust the output of the optical information.

The response characteristic of the image capturing device comprises at least one of a brightness characteristic, a color characteristic, a gamma characteristic, or a distribution characteristic.

The obtained image is a red, green, blue (RGB) image and the compensated image is an XYZ image.

The response characteristic of the image capturing device is a characteristic of a camera, included in the image capturing device, configured to recognize a light-emission characteristic of the display.

The mobile terminal may further include a memory configured to store information in which light-emission characteristics of models of displays are mapped to response characteristics of models of image capturing devices of mobile terminals, wherein the processor is further configured to obtain information indicating the response characteristic of the image capturing device of the mobile terminal that is mapped to a light-emission characteristic of the display from the memory by identifying a model of the display and a model of the mobile terminal, and compensate the obtained image using the obtained information.

The processor may be further configured to obtain an image quality value of the compensated image, and generate the adjustment signal using information required to adjust the image quality value to a reference value.

The mobile terminal may further include a user interface configured to receive user input information, wherein the reference value is an absolute value included in the user input information.

The mobile terminal may further include a user interface configured to receive user input information, wherein the processor is further configured to split the compensated image into a plurality of adjustment unit areas based on adjustment unit information included in the user input information, sequentially assign identifiers (IDs) to the respective split adjustment unit areas, and generate the adjustment signal for each area of the display corresponding to each of the split adjustment unit areas of the compensated image to which the IDs are respectively assigned.

The plurality of adjustment unit areas are a set of the plurality of panels included in the display, a panel, a cabinet constituting the panel, a module constituting the cabinet, or pixels constituting the module.

The processor may be further configured to identify a certain area in each split adjustment unit area using identification information included in the user input information, and obtain an image quality value of the identified certain area, and the adjustment signal comprises an ID of each split adjustment unit area comprising the identified certain area, and further comprises a position of the certain area.

The communicator may be further configured to receive an output control signal from the display, and the processor is further configured to generate the adjustment signal using the output control signal.

The adjustment signal comprises information indicating an item to be adjusted among brightness, color, uniformity of brightness or color, gray level, gamma, and color space of the optical information output by the display.

The display may output the optical information by outputting an image quality measurement pattern, and the image quality measurement pattern may vary according to the item to be adjusted.

The image capturing device may be configured to determine whether the image satisfies an image capture condition, and obtain the image based on a determination that the image satisfies the image capture condition.

According to another embodiment of the disclosure, a method, performed by a mobile terminal, of controlling a display includes obtaining an image of the display, the display comprising a plurality of panels and being configured to output optical information; compensating the obtained image; generating, using the compensated image, an adjustment signal to adjust the output of the optical information; and transmitting the adjustment signal to the display to permit the display to adjust the output of the optical information.

According to another embodiment of the disclosure, a computer-readable recording medium has recorded thereon a program for executing a method of controlling a display, the method being performed by a mobile terminal and including obtaining an image of the display, the display comprising a plurality of panels and being configured to output optical information; compensating the obtained image; generating, using the compensated image, an adjustment signal to adjust the output of the optical information; and transmitting the adjustment signal to the display to permit the display to adjust the output of the optical information.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 12 is a flowchart for describing a method of adjusting image quality of a display performed by a mobile terminal, according to an embodiment of the disclosure; and FIG. 13 is a flowchart for describing a method of generating an adjustment signal performed by a mobile terminal using user input information, according to an embodiment of the disclosure.

DETAILED DESCRIPTION

Figure 1:
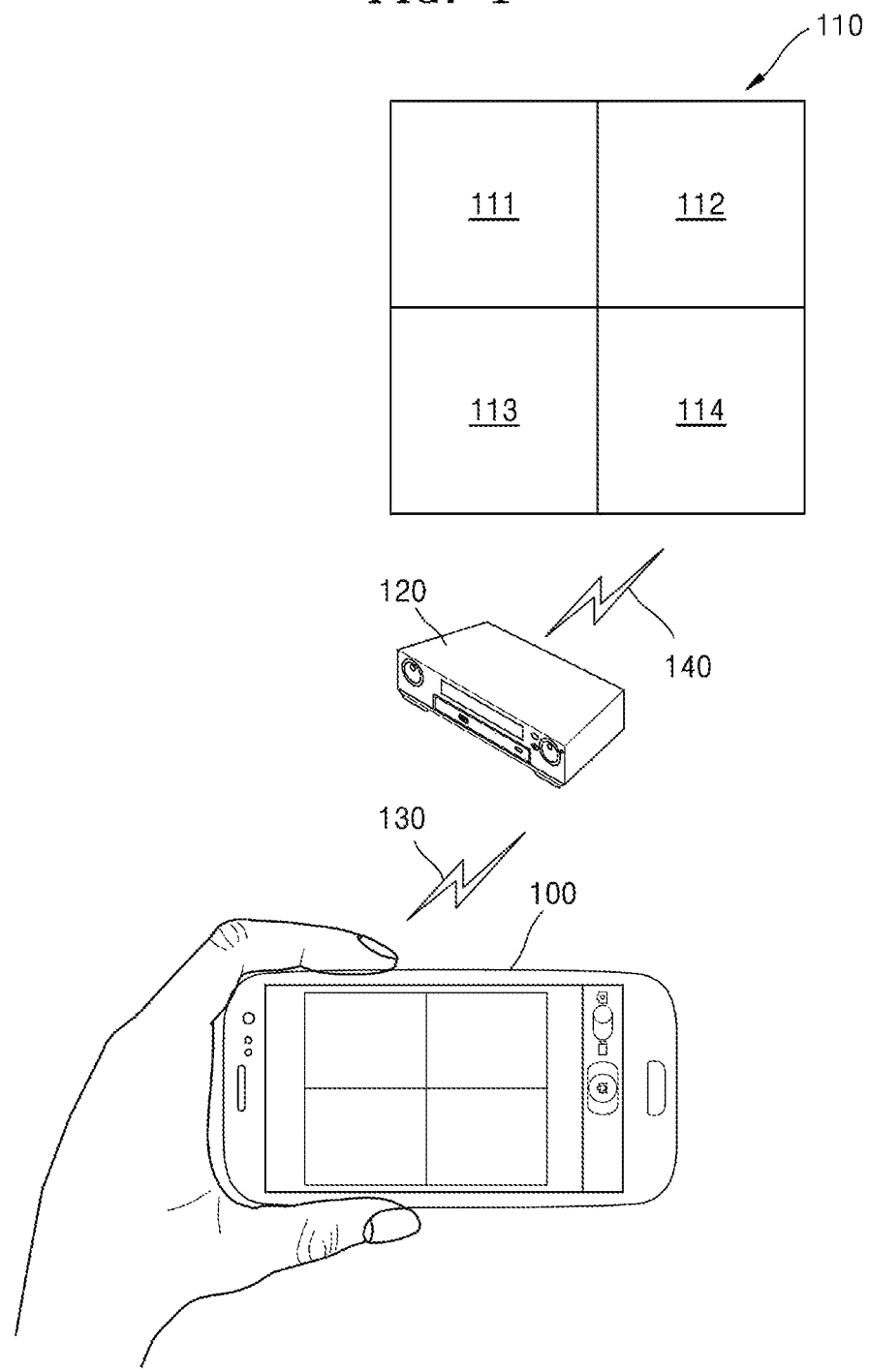
FIG. 1 is a diagram for describing a process of adjusting image quality of a display controlled by a mobile terminal, according to an embodiment of the disclosure.

The disclosure will now be described more fully with reference to the accompanying drawings for one of ordinary skill in the art to be able to perform the disclosure without any difficulty. The disclosure may, however, be embodied in many different forms and should not be construed as being limited to the embodiments set forth herein.

All terms used in the disclosure are general terms that are selected in consideration of their functions in the disclosure and are currently widely used. However, the terms may have different meanings according to an intention of one of ordinary skill in the art, precedent cases, or the appearance of new technologies. Thus, the terms used herein should be defined based on the meaning of the terms together with the description throughout the specification.

Furthermore, all terms used in the disclosure are merely used to describe particular embodiments, and are not intended to limit the disclosure.

Throughout the specification, it will also be understood that when an element is referred to as being "connected to" another element, it can be directly connected to the other element, it can be electrically connected to the other element by having an intervening element interposed therebetween, it can be connected to the other element via wired or wireless network, and/or the like.

In the detailed description (in particular, in the claims), the use of the term "the" and similar indicating terms may correspond to singular and plural forms. Also, an order of operations performed by the methods according to the disclosure may be changed unless there is a particular description about the order of operations. Thus, the disclosure is not limited to the order of operations.

The terms "according to some embodiments of the disclosure" or "according to an embodiment of the disclosure" used throughout the specification do not necessarily indicate the same embodiment of the disclosure.

Some embodiments of the disclosure may be described in terms of functional block components and various processing steps. Some or all of functional blocks may be realized by any number of hardware and/or software components configured to perform the specified functions. For example, the functional blocks of the disclosure may be implemented by one or more microprocessors or may be implemented by circuit components for predetermined functions. In addition, for example, the functional blocks of the disclosure may be implemented with any programming or various scripting languages. The functional blocks may be implemented in algorithms that are executed on one or more processors. Furthermore, the disclosure could employ any number of techniques according to the related art for electronics configuration, signal processing and/or data processing, and the like. The terms "mechanism," "element," "means," "configuration," or the like, may be broadly used and are not limited to mechanical or physical components.

Furthermore, connecting lines or connectors between elements shown in the drawings are intended to represent exemplary functional connection and/or physical or circuit connection between the elements. In actual devices, connection between the elements may be represented by replaceable or added various functional connection, physical connection, or circuit connection.

The terms such as "unit" and "module" indicate a unit for processing at least one function or operation, wherein the unit and the module may be embodied as hardware, software, or any combination of hardware and software.

According to an embodiment of the disclosure, the term "user" refers to a person who controls functions or operations of a mobile terminal 100, a display 110, and a display controller 120, and may be, as examples, a viewer, a manager, or an installation engineer.

Throughout the disclosure, the expression "at least one of a, b, or c" indicates only a, only b, only c, both a and b, both a and c, both b and c, all of a, b, and c, or variations thereof.

Hereinafter, the disclosure will be described in detail with reference to the accompanying drawings.

FIG. 1 is a diagram for describing a process of adjusting image quality of a display under the control of a mobile terminal according to an embodiment of the disclosure.

Referring to FIG. 1, a user may capture an image of a display 110 by using a mobile terminal 100.

According to an embodiment of the disclosure, the display 110 may be a video-wall including a plurality of panels. The display 110 may be an apparatus configured to use a plurality of panels as a single integrated screen. In FIG. 1, the display 110 includes four panels 111, 112, 113, and 114 arranged in the form of a 2×2 matrix. However, the display 110 is not limited thereto and the number and arrangement of panels included in the display 110 may be implemented in various forms. For example, the panels may also be arranged in various forms of a step, a pyramid, a circle, and the like.

The plurality of panels 111, 112, 113, and 114 included in the display 110 may be display devices that may operate independently. The panels included in the display 110 may be liquid crystal display (LCD) panels or panels including various light-emitting devices, such as light-emitting diodes (LEDs), organic light-emitting diodes (OLEDs), and cold cathode fluorescent lamps (CCFLs).

The panels 111, 112, 113, and 114 may be implemented as digital TVs, 3D-TVs, smart TVs, LED TVs, OLED TVs, plasma TVs, and the like, and may be flat display devices, curved display devices having a curvature, or flexible display devices having an adjustable curvature. The output resolution of each panel may be, for example, higher than High Definition (HD), Full HD, Ultra HD, 8K Ultra HD, or 8K Ultra HD resolution.

In FIG. 1, a display controller 120, as a device configured to control the display 110, may be implemented as various devices such as a personal computer, a server, a laptop computer, or a portable electronic device.

The display controller 120 may transmit signals to the mobile terminal 100 and receive signals from the mobile terminal 100 via a first communication network 130. The display controller 120 may receive a signal to control the display 110 from the mobile terminal 100, and adjust the image quality of the display 110 using the received signal. To this end, the display controller 120 may transmit signals to the display 110 and receive signals from the display 110 via a second communication network 140. The second communication network 140 may be a wired or wireless communication network.

Each of the first communication network 130 and the second communication network 140 may be a telecommunications network. The telecommunications network may include a computer network, the Internet, Internet of Things, or a telephone network. Each of the first communication network 130 and the second communication network 140 may include communication networks such as Bluetooth, Wi-Fi, Bluetooth Low Energy (BLE), Infrared Data Association (IrDA), Near Field Communication (NFC), or a laser communication network.

The display controller 120 may control the display 110 via the second communication network 140, and control optical information output by the display 110 according to an embodiment of the disclosure. Although FIG. 1 illustrates the display 110 and the display controller 120 as separate devices, the display 110 may also be integrated with the display controller 120.

According to an embodiment of the disclosure, the mobile terminal 100 may capture and obtain an image of the display 110 that outputs a screen. The screen to be output from the display 110 may vary according to an item to be adjusted among items of the optical information of the display 110.

For example, when the display 110 outputs a bright white pattern, it may be easy to measure brightness among the items of optical information output from the display 110. Alternatively, a red, green, blue, yellow, magenta, cyan (R/G/B/Y/M/C) screen may be displayed on the display 110 to permit the visualization of color among the items of optical information output from the display 110. Also, a pattern in which gray levels sequentially change from a low gray level to a high gray level, that is, from a dark black level to a bright white level, at regular intervals or at predetermined level intervals, may be output on the display 110 to permit visualization of gamma among the items of optical information output from the display 110. In addition, the above patterns may be output on the display 110 in a combined form. However, these are examples of an embodiment of the disclosure, the screen of the display 110 may show any other various types of patterns in addition to those mentioned above.

Hereinafter, the screen output by the display 110 will be referred to as an image quality measurement pattern for descriptive convenience.

The mobile terminal 100 may obtain an image by capturing the image quality measurement pattern output by the display 110.

According to an embodiment of the disclosure, the mobile terminal 100 may determine whether the image satisfies image capture conditions before obtaining the image, and obtain the image based on a determination that the image satisfies the image capture conditions. The image capture conditions may be determined based on whether the image is well captured on a screen of a camera (not shown) included in the mobile terminal 100. The mobile terminal 100 may determine whether the image satisfies the image capture conditions in consideration of a distance and angle between the mobile terminal 100 and the display 110.

The mobile terminal 100 may measure optical information of the display 110 using the obtained image. The image obtained by the mobile terminal 100 may be an RGB image.

According to an embodiment of the disclosure, the mobile terminal 100 may compensate the obtained image according to characteristics of the mobile terminal 100. The characteristics of the mobile terminal 100 may be characteristics of a camera of an image capturing device (not shown) included in the mobile terminal 100. Cameras may recognize optical information output from the display 110 differently. This is because sensors (not shown) and lenses (not shown) respectively included in the cameras may have different response characteristics of recognizing optical information. Thus, response characteristics of a camera should be compensated for in order to improve optical information measurement.

The response characteristics of a camera may include not only color characteristics, but also brightness characteristics, gamma characteristics, and distribution characteristics. The mobile terminal 100 may perform at least one of color information compensation, brightness characteristic compensation, gamma characteristic compensation, or distribution information compensation to compensate for response characteristics of the camera.

According to an embodiment of the disclosure, the mobile terminal 100 may perform brightness compensation for an amount of light output from the display 110 and arriving at a sensor of the camera and response characteristics of image data by a sensor. Also, the mobile terminal 100 may perform color information compensation to compensate for response characteristics of the camera, in which Red, Green, and Blue pixel values of a sensor of the camera respond to the color of the display 110. For example, an RGB value of a sensor should increase in accordance with an increase in the amount of light output from the display 110. However, the degree of recognizing RGB values may vary according to sensors included in various cameras. Thus, in consideration of different response characteristics according to different models of cameras, color information compensation may be performed.

According to an embodiment of the disclosure, the mobile terminal 100 may perform distribution information compensation for non-uniformity of brightness distribution in an image of the camera due to a vignetting phenomenon of the camera and viewing angle characteristics of the panels of the display 110. The vignetting phenomenon is a phenomenon where edges or corners of a picture are darker due to sensitivity of a sensor of a camera occurring even by a very small manufacturing tolerance. The vignetting phenomenon may also occur because the lens produces the vignetting effect. Light passing through a lens forms a circular image. In this case, when a diameter of an image circle of the lens forming the image is smaller than a diagonal length of an imaging screen, the image is not formed at corners causing a vignetting phenomenon.

The mobile terminal 100 may supplement measurement performance of a general-use camera included in the mobile terminal 100 through various compensation processes, such as color information compensation, brightness characteristic compensation, gamma characteristic compensation, or distribution information compensation. Thus, the user may use the mobile terminal 100 to generate a measurement image approximately equivalent to that of image-based professional measurement equipment.

Light-emission characteristics of the panels 111, 112, 113, and 114 constituting the display 110 may be different according to manufacturers and model numbers of the panels 111, 112, 113, and 114, and response characteristics of cameras may also be different according to manufacturers and model numbers of the mobile terminal 100.

According to an embodiment of the disclosure, the mobile terminal 100 may receive display identification information indicating, for example, manufacturers or model numbers of the display 110 of the panels 111, 112, 113, and 114 from the display 110.

According to an embodiment of the disclosure, to compensate for response characteristics of the camera, the mobile terminal 100 may use information in which light-emission characteristics according to various models of displays are matched to respective response characteristics according to models of cameras of various mobile terminals. According to an embodiment of the disclosure, the mobile terminal 100 may include a memory (not shown) that stores compensation information matched to light-emission characteristics according to models of displays to compensate for response characteristics of the camera of the mobile terminal 100. The mobile terminal 100 may retrieve compensation information from the memory of the mobile terminal 100 using an identified model number of the display 110 and compensate the image by using the found compensation information. According to an embodiment of the disclosure, the mobile terminal 100 may receive compensation information from an external server (not shown) via a communication network (not shown), and use the received compensation information.

According to an embodiment of the disclosure, the mobile terminal 100 may obtain compensation information by using artificial intelligence (AI) technology. AI technology may include machine learning (deep learning) and element technologies that utilize the machine learning. The mobile terminal 100 includes a processor (not shown) configured to execute one or more instructions and the processor may use a training model using at least one neural network. According to an embodiment of the disclosure, the neural network may compensate the image based on supervised learning that uses camera characteristics of mobile terminals and light-emission characteristics of displays as input values, or based on unsupervised learning that determines a pattern to compensate for response characteristics of sensors or lenses trained to obtain characteristics in response to optical information output from displays without using separate supervising. In addition, for example, the neural network may be trained to obtain a method of compensating characteristics for cameras, sensors, or lenses by reinforcement learning using feedback on whether a result determined by training is correct.

The mobile terminal 100 may obtain a compensated image expressed by brightness and color coordinates (XYZ) by compensating an RGB image obtained by image capturing.

The mobile terminal 100 may obtain an image quality value by measuring the image quality of the compensated image. According to an embodiment of the disclosure, the mobile terminal 100 may obtain image quality values of a subset of areas of the compensated image.

According to an embodiment of the disclosure, the mobile terminal 100 may receive user input information from the user. The user input information may include an item to be adjusted, a reference value, adjustment unit information, certain area identification information, and the like. The item to be adjusted may be information indicating an item of optical information output from the display 110 to be adjusted. The item to be adjusted may be optical information such as brightness, color, uniformity of brightness or color, gray level, gamma, and color space.

The reference value is a target value to which the image quality value is adjusted, and the reference value may be an absolute value set by the user. The mobile terminal 100 may generate an adjustment signal based on information required to change the measured image quality value to the reference value using the reference value included in the user input information.

According to an embodiment of the disclosure, the mobile terminal 100 may obtain a difference between the image quality value and the reference value, and generate the adjustment signal based on the difference between the image quality value and the reference value satisfying a threshold.

The adjustment unit information may be information indicating a unit to adjust optical information. The mobile terminal 100 may split an image into a plurality of adjustment unit areas according to an adjustment unit based on the adjustment unit information. The adjustment unit may be an entire set of a plurality of panels included in one display, a subset of the plurality of panels, a panel, a cabinet constituting the panel, a module constituting the cabinet, or pixels constituting the module.

For example, when the plurality of panels 111, 112, 113, and 114 included in the display 110 are LCD panels or LED panels, each panel may be used as a unit. That is, in the case of LCD panels, each panel may be controlled as a unit. However, when a panel includes a plurality of sub-units, each sub-unit may be adjusted as one unit. For example, an LED panel may include a set of a plurality of cabinets each including a set of a plurality of modules. Also, each of the modules may include a plurality of pixels. Because the LED panel may be formed by joining the respective sub-units, the adjustment unit to adjust the panel may also be the whole LED panel, a cabinet constituting the LED panel, a module constituting the cabinet, or pixels constituting the module.

According to an embodiment of the disclosure, the user may select an adjustment unit by using user input information. The mobile terminal 100 may split the display 110 into areas according to the adjustment unit selected by the user and assign identifiers (IDs) to the split areas, respectively. The mobile terminal 100 may sequentially assign IDs to the areas split according to the adjustment unit. According to an embodiment of the disclosure, when the adjustment unit is a panel, the mobile terminal 100 may assign IDs to the four panels included in the display 110 of FIG. 1 starting from the panel in the first column of the first row sequentially to the panel in the second column of the first row, the panel in the first column of the second row, and the panel in the second column of the second row. According to another embodiment of the disclosure, for example, when the display 110 includes four LED panels and the adjustment unit is a module, the mobile terminal 100 may split the display 110 into a plurality of module areas constituting each LED panel and assign IDs to the split module areas, respectively. When the adjustment unit is the module, the mobile terminal 100 may generate adjustment signals for the respective modules and transmit the generated adjustment signals to the display 110 or the display controller 120. Alternatively, the mobile terminal 100 may generate adjustment signals for a subset of modules required to be adjusted, and transmit the generated adjustment signals to the display 110 or the display controller 120.

The display 110 or the display controller 120 may adjust an output of optical information of modules required to be adjusted using the adjustment signals generated for the respective modules or the selected modules and received from the mobile terminal 100.

The certain area identification information may indicate a certain area within the adjustment unit area, whose image quality is desired to be measured by the user. For example, when the adjustment unit is a panel, the mobile terminal 100 may assign IDs to the four panels 111, 112, 113, and 114 included in the display 110, respectively, and identify a certain area within one of the split areas to which IDs are assigned, respectively, based on certain area identification information. The mobile terminal 100 may measure an image quality value of the identified certain area.

When an image quality value of an image is different from the reference value, the mobile terminal 100 may generate an adjustment signal by using information required to adjust the image quality value to the reference value. According to an embodiment of the disclosure, the adjustment signal may be a signal to adjust an output control signal.

The display controller 120 may use the output control signal to control optical information output by the display 110. That is, optical information output by the display 110 may be controlled according to the output control signal. The mobile terminal 100 may receive the output control signal to control optical information from the display controller 120.

The mobile terminal 100 may obtain a target optical information to change the measured image quality value of the image to the reference value. Then, the mobile terminal 100 may obtain a target output control signal to be used when the display controller 120 controls the display 110 to output the target optical information.

The mobile terminal 100 may obtain a target output control signal using a current output control signal received from the display controller 120. The mobile terminal 100 may generate an adjustment signal indicating a value by which the output control signal should be adjusted and transmit the generated adjustment signal to the display controller 120.

The display controller 120 may adjust the output control signal by using the adjustment signal received from the mobile terminal 100. The display controller 120 may control output of the display 110 using the adjusted output control signal.

Accordingly, the display 110 displays optical information adjusted in accordance with the adjustment signal generated by the mobile terminal 100, and thereby improving the image quality of the panels 111, 112, 113, and 114 of the display 110.

Figure 2:
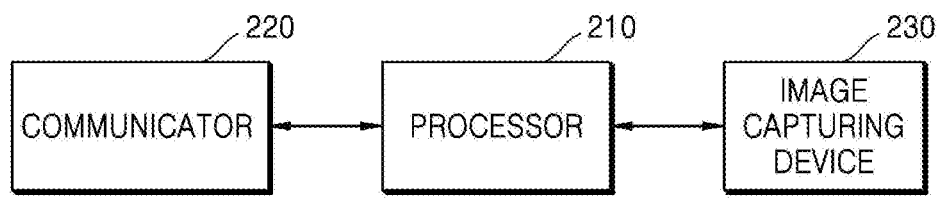
FIG. 2 is an internal block diagram of a mobile terminal configured to control a display, according to an embodiment of the disclosure.

FIG. 2 is an internal block diagram of a mobile terminal configured to control a display according to an embodiment of the disclosure. Referring to FIG. 2, a mobile terminal 200 may include a processor 210, a communicator 220, and an image capturing device 230.

The mobile terminal 200 may be implemented by various electronic devices that may be carried by the user. The mobile terminal 200, as an electronic device capable of capturing an image and performing a communication function, may include at least one of smart phone, tablet personal computer (PC), mobile phone, videophone, e-book reader, laptop PC, netbook computer, personal digital assistant (PDA), portable multimedia player (PMP), MP3 player, wearable device, smart watch, or camera capable of performing a communication function.

The processor 210 controls the overall operation of the mobile terminal 200. For example, the processor 210 may perform the function of the mobile terminal 200 by executing one or more instructions stored in memory (not shown). In addition, although FIG. 2 illustrates one processor 210, the mobile terminal 200 may further include a plurality of processors (not shown). In this example, operations performed by the mobile terminal 200 according to an embodiment of the disclosure may be performed via at least one of the plurality of processors, respectively.

The communicator 220 may include a communication module such as a short-distance communication module, a wired communication module, a mobile communication module, or a broadcast receiving module. The communication module refers to a communication module performing data transfer via a network compliant with communication standards such as a tuner for receiving broadcasts, Bluetooth, wireless local area network (WLAN), Wi-Fi, wireless broadband (Wibro), world interoperability for microwave access (Wimax), CDMA, and WCDMA.

The communicator 220 may communicate with the display controller 120 via a wired or wireless network. According to an embodiment of the disclosure, upon using the display controller 120 integrated with the display 110, the communicator 220 may adjust optical information output by the display 110 via communication with the display 110. In particular, the communicator 220 may transmit data to and receive data from the display 110 connected via a wired or wireless network under the control of the processor 210. According to an embodiment of the disclosure, the communicator 220 may receive display identification information and the output control signal from the display 110 via at least one of 3G, 3GPP, 4G, Wi-Fi, 5G, or any various communication standards to be developed in the future and transmit an adjustment signal to adjust the output control signal to the display 110.

The image capturing device 230 may generate an image by capturing an object, and perform signal processing on the image. According to an embodiment of the disclosure, the image capturing device 230 may obtain an image by capturing the entire display 110 including a plurality of panels or a portion of the display 110. The image capturing device 230 may include a camera (not shown). The camera may form an image of the object on an image sensor (not shown) such as a charge coupled device (CCD) or a complementary metal-oxide semiconductor (CMOS) sensor, and the image sensor may convert light received via the camera into electric signals. Also, the image capturing device 230 may perform a signal processing operation such as auto exposure (AE), auto white balance (AWB), color recovery, correction, sharpening, gamma, and lens shading correction, on the obtained image.

According to an embodiment of the disclosure, the image capturing device 230 may determine whether the image satisfies image capture conditions, and obtain the image based on a determination that the image satisfies the image capture conditions. To this end, the image capturing device 230 may manage the image capture conditions by calculating or receiving input of a distance, an angle, or the like, between the display 110 and the mobile terminal 200.

The processor 210 may compensate the image obtained by the image capturing device 230 using response characteristics of the camera. Response characteristics of the camera may be characteristics of a camera inside the image capturing device 230 recognizing light-emission characteristics of the display 110. The processor 210 may determine whether adjustment of the image quality of a display 110 is required by measuring the image quality of the entire area or a portion of the compensated image, and comparing the measured image quality of the compensated image with the reference value. Upon determination that adjustment of the image quality of a display 110 is required, the processor 210 may generate the adjustment signal to adjust the output control signal that controls optical information output by the display 110. The communicator 220 may transmit the generated adjustment signal to the display 110 to control optical information output by the display 110.

Accordingly, the user may use the mobile terminal 200 to adjust the image quality of the display 110 by capturing an image of the display 110, compensating the captured image, and generating the adjustment signal to adjust the image quality of the display 110 using the compensated image.

Figure 3:
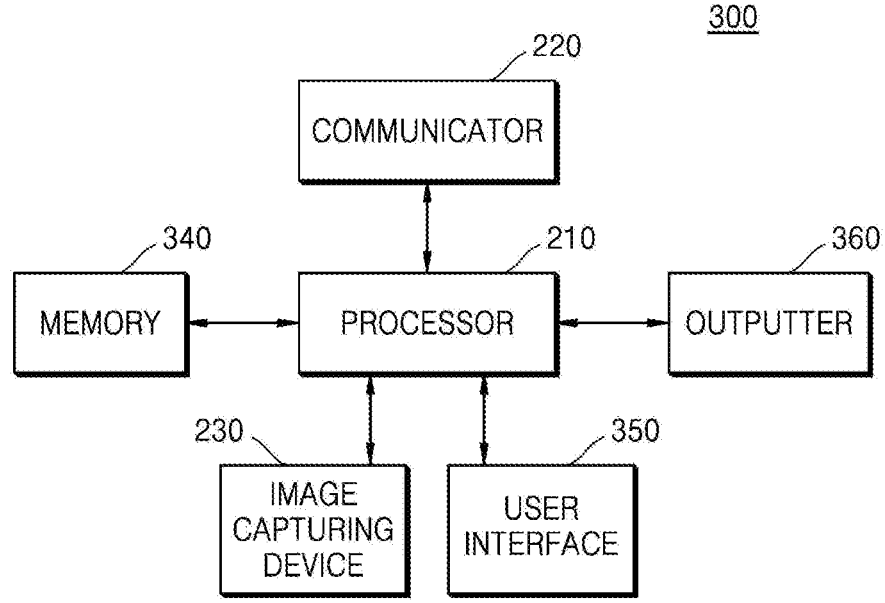
FIG. 3 is an internal block diagram of a mobile terminal configured to control a display, according to an embodiment of the disclosure.

FIG. 3 is an internal block diagram of a mobile terminal configured to control a display according to an embodiment of the disclosure. Referring to FIG. 3, a mobile terminal 300 may further include a memory 340, a user interface 350, and an outputter 360 in addition to the processor 210, the communicator 220, and the image capturing device 230. In the following descriptions of FIG. 3, detailed descriptions regarding the processor 210, the communicator 220, and the image capturing device 230 given above with reference to FIG. 2 will not be repeated.

The memory 340 may include a storage medium such as a flash memory type memory, a hard disk type memory, a multimedia card micro type memory, a card type memory (e.g., secure digital (SD) or extreme digital (XD) memory), random access memory (RAM), static random access memory (SRAM), read-only memory (ROM), electrically erasable programmable read-only memory (EEPROM), programmable read-only memory (PROM), a magnetic memory, a magnetic disk, and an optical disc.

The memory 340 according to an embodiment of the disclosure may store programs for processing and controlling by the processor 210. Also, the memory 340 may store one or more instructions executable by the processor 210. According to an embodiment of the disclosure, the one or more instructions stored in the memory 340 may be instructions to compensate the obtained image. According to an embodiment of the disclosure, the one or more instructions stored in the memory 340 may be instructions to measure the image quality value of the compensated image. Also, according to an embodiment of the disclosure, the one or more instructions stored in the memory 340 may be instructions to generate adjustment information required to convert the measured image quality value to the reference value.

The memory 340 may store the obtained image captured by the image capturing device 230.

According to an embodiment of the disclosure, the memory 340 may also store compensation information to compensate the image. According to an embodiment of the disclosure, the memory 340 may also store information in which light-emission characteristics according to models of displays are matched to respective response characteristics according to models of the cameras of mobile terminals.

According to an embodiment of the disclosure, the memory 340 may also store compensation information matched to respective light-emitting characteristics according to models of displays to compensate for response characteristics of the camera of the mobile terminal. The compensation information stored in the memory 340 may be compensation functions performed by the processor 210 and used to compensate for brightness, color, distribution, and the like, using the obtained image. Or, the compensation information stored in the memory 340 may be result values previously obtained for respective models of displays and models of mobile terminals.

The processor 210 may obtain compensation information using identified models of the display 110 and the mobile terminal 300 from the memory 340. Alternatively, the processor 210 may extract a compensation function used to compensate for brightness, color, distribution, and the like, from the memory 340 and directly generate compensation information using the extracted compensation function.

The processor 210 may compensate the image obtained by the image capturing device 230 using compensation information. The processor 210 may compensate the obtained image by performing color information compensation, brightness characteristic compensation, gamma characteristic compensation, or distribution characteristic compensation.

According to an embodiment of the disclosure, the processor 210 may store one or more instructions in a memory (not shown) provided in the processor 210 and control the above-described operations by executing the one or more instructions stored in the memory. That is, the processor 210 may perform a selected operation by executing one or more instructions or programs stored in an internal memory provided in the processor 210, the memory 340, or programs. The processor 210 may compensate the image obtained by the mobile terminal 300 by executing the one or more instructions stored in the memory 340 or the internal memory, and generate an adjustment signal using the compensated image.

The user interface 350 may receive a user input to control the mobile terminal 300.

The user interface 350 may include a microphone (not shown) capable of receiving input speech from the user, and recognizing a control command via the input speech of the user. In addition, when the mobile terminal 300 is implemented with a touch screen, the user interface 350 may receive a user input via a touch gesture of the user, an input pen, or the like. The user interface 350 may receive a signal via a touch panel that detects a touch of the user. The user interface 350 may also receive a signal via a user input device including a button receiving a push operation of the user, a wheel receiving a rotation operation of the user, a key board, and a dome switch, without being limited thereto. The user interface 350 may receive a control command for the mobile terminal 300 from an external device such as a distance remote control device or a server by using short-distance communication including infrared data association (IrDA) or Bluetooth.

According to an embodiment of the disclosure, the user interface 350 may receive user input information from the user. The user input information may include configuration information, adjustment unit information, certain area identification information, an item to be adjusted, a reference value, and the like.

The configuration information may refer to information to split the obtained image of the display 110 into the number panels constituting the display 110, and the mobile terminal 300 may split the obtained image into areas in accordance with the configuration information. According to an embodiment of the disclosure, the mobile terminal 300 may receive the configuration information directly from the display 110 or the display controller 120 instead of from a user.

The adjustment unit information may be information indicating the unit for adjusting the image. The mobile terminal 300 may determine whether to adjust the image using a panel as one unit, or a module or pixel of the panel as one unit based on adjustment unit information.

According to an embodiment of the disclosure, the adjustment unit may be a set of some panels selected from the plurality of panels 111, 112, 113, and 114 included in the display 110. For example, the adjustment unit may be a group of two panels 111 and 112. The mobile terminal 300 may recognize the adjustment unit based on adjustment unit information and assign IDs according to the adjustment unit. The mobile terminal 300 may identify an object to be adjusted and transmit the adjustment unit and an ID of the identified area to the display 110 or the display controller 120 to inform an area to be adjusted of the display 110 corresponding to the selected ID of the adjustment unit.

The certain area identification information may be information to identify an area of the image whose image quality is desired to be measured. The mobile terminal 300 may identify a certain area from the areas split according to the adjustment unit by using certain area identification information and obtain an image quality value of the identified certain area. For example, when the adjustment unit is a panel, the mobile terminal 300 may assign IDs to the respective four panels 111, 112, 113, and 114 included in the display 110 of FIG. 1, identify a certain area from each of the four panels 111, 112, 113, and 114 based on the certain area identification information, and measure an image quality value of each certain area.

According to an embodiment of the disclosure, the certain area may be an area adjacent to a boundary portion where the panels meet. Because human eyes tend to see boundaries of respective panels, uniformity of the boundary portions may be more important than the other areas. Thus, the user may set an area around the boundary portion as the certain area. In this example, the mobile terminal 300 may measure the image quality value of the certain area around the boundary portion.

The item to be adjusted may be information indicating items of optical information to be adjusted output by the display 110. The optical information output from the display 110 may include various information such as brightness, color, uniformity of brightness or color, gray level, gamma, and color space. The user may select an item to be adjusted from the optical information. The mobile terminal 300 may measure the image quality of the item to be adjusted among image qualities of the obtained image of the display 110 in accordance with the item to be adjusted included in the user input information. For example, when the user sets brightness as the item to be adjusted, the mobile terminal 300 may measure brightness of the image.

The reference value may refer to a target value of the item to be adjusted. When the item to be adjusted is brightness according to the above embodiment of the disclosure, the mobile terminal 300 may change a measured brightness value of the image to a reference brightness value.

The outputter 360 may output the image obtained by the image capturing device 230 to a screen (not shown) of the mobile terminal 300. According to an embodiment of the disclosure, the outputter 360 may output a screen for receiving the user input information from the user. The mobile terminal 300 may display split areas over the image output by the outputter 360 by using configuration information included in user input information. Also, the mobile terminal 300 may split the image into areas according to the adjustment unit based on the adjustment unit information and output the split areas to which IDs are assigned, respectively. The mobile terminal 300 may also display certain areas identified based on certain area identification information by overlapping the image and output the image quality values of the certain area measured in accordance with the item to be adjusted.

Figure 4:
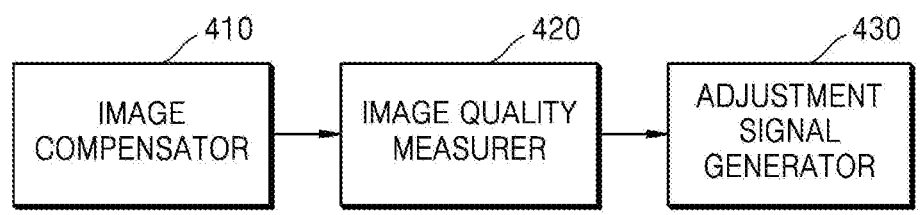
FIG. 4 is an internal block diagram of a processor included in a mobile terminal, according to an embodiment of the disclosure.

FIG. 4 is an internal block diagram of a processor included in a mobile terminal according to an embodiment of the disclosure.

Referring to FIG. 4, a processor 210 may include an image compensator 410, an image quality measurer 420, and an adjustment signal generator 430.

The image compensator 410 may receive an obtained image and compensate the received image in accordance with response characteristics of the camera. In this regard, the obtained image may be an RBG image. The image compensator 410 may generate an XYZ image by compensating for at least one of color information, brightness characteristics, gamma characteristics, or distribution characteristics.

Response characteristics of a camera (not shown) included in the mobile terminal 200 may be color characteristics, brightness characteristics, gamma characteristics, distribution characteristics, and the like. The image compensator 410 may perform at least one of color information compensation, brightness characteristic compensation, gamma characteristic compensation, or distribution information compensation to compensate for response characteristics of the camera.

According to an embodiment of the disclosure, the image compensator 410 may perform brightness compensation to compensate for a difference between an intensity of light output from the display 110 and an intensity recognized by a sensor. Thus, the image compensator 410 may compensate for linearity between the amount of light and the sensor.

According to an embodiment of the disclosure, the image compensator 410 may perform color information compensation to compensate for response characteristics of a sensor recognizing Red, Green, and Blue colors for the amount of light output from the display 110. That is, the image compensator 410 may compensate for the sensor's degree of recognizing RGB values of the amount of light.

According to an embodiment of the disclosure, the image compensator 410 may perform distribution information compensation to compensate for a vignetting phenomenon of the lens of the camera or non-uniformity of brightness distribution in the image. When obtaining an image, the image capturing device 230 may recognize light of a closer or orthogonal portion to the display 110 as being brighter, and light of a farther or inclined portion as being darker or a different color. Thus, the image compensator 410 may compensate the obtained image by performing distribution information compensation by considering these characteristics.

The image compensator 410 may obtain compensation information corresponding to a current mobile terminal 100 and a current display 110 using compensation information of displays and mobile terminals stored in the memory (not shown) according to models thereof, to compensate the image. Alternatively, the image compensator 410 may extract a compensation function used to compensate for brightness, color, distribution, and the like, from the memory and perform compensation by using the compensation function.

Alternatively, the image compensator 410 may compensate the image using AI technology. The image compensator 410 may compensate the image by using response characteristics of the sensor or the lens to optical information output from a display by a training model using at least one neural network.

The image quality measurer 420 may measure the image quality using the compensated image, and obtain an image quality value. The image quality measurer 420 may split the image into areas according to the adjustment unit selected by the user and assign IDs to the split areas, respectively. The image quality measurer 420 may measure an image quality value of a certain area in a split area to which an ID is assigned.

The image quality measurer 420 may receive an input of an item to be adjusted selected by the user. The item to be adjusted may be information indicating various items of optical information output by the display 110 such as brightness, color, uniformity of brightness or color, gray level, gamma, and color space.

According to an embodiment of the disclosure, the image quality measurer 420, not the user, may determine the item to be adjusted. For example, upon determination that brightness characteristics of the obtained image of the display 110 is important, the image quality measurer 420 may measure a brightness value of the certain area. Alternatively, the image quality measurer 420 may automatically recognize the item to be adjusted based on an image quality measurement pattern output from the display 110 and measure a value of the item to be adjusted. For example, when the image quality measurement pattern is a bright white pattern, the image quality measurer 420 recognizes brightness as the item to be adjusted. When the image quality measurement pattern is a screen from a low gray level to a high gray level, the image quality measurer 420 recognizes gamma as the item to be adjusted among the items of optical information.

The image quality measurer 420 may compare the measured image quality value with the reference value. The reference value may also be an image quality value measured in a different adjustment unit other than a current adjustment unit whose image quality value is measured or an image quality value of a different panel.

According to an embodiment of the disclosure, the reference value may be an absolute value set by the user. In this example, the mobile terminal 100 may change the measured image quality value to a value desired by the user without obtaining an image quality value of a different adjustment unit or a different panel. Thus, when the display whose image quality is desired to be measured is formed of a large-sized panel, the image quality value of the panel may also be changed to a value desired by the user.

The image quality measurer 420 may determine whether to generate an adjustment signal based on whether a difference between the image quality value and the reference value satisfies a threshold.

The adjustment signal generator 430 may generate an adjustment signal based on the difference between the image quality value measured by the image quality measurer 420 and the reference value satisfying the threshold. The adjustment signal may be generated using information that permits the change of the image quality value to the reference value. According to an embodiment of the disclosure, the adjustment signal may be a signal to adjust a measured value of an item to be adjusted to a reference value based on the item to be adjusted. For example, when the item to be adjusted is brightness and a difference between a measured brightness value of a certain area and a reference value satisfies a threshold, the adjustment signal generator 430 may obtain a target output control signal to be output by the display 110 to adjust the brightness value of the certain area to the reference value, and generate an adjustment signal to adjust a current output control signal to the target output control signal.

According to an embodiment of the disclosure, the user may add an item to be adjusted by using user input information. For example, when the user also desires to adjust color or gamma after adjusting brightness, the image quality measurer 420 may measure a color or a gamma value of the certain area of the image and compare the measured color or gamma value with a reference color or a reference gamma value therefor. The adjustment signal generator 430 may obtain a target output control signal to be output from the display 110 to change the color or the gamma value to the reference color or the reference gamma value, and generate an adjustment signal based thereon.

After generating the adjustment signal, the adjustment signal generator 430 may transmit the generated adjustment signal to the display 110 or the display controller 120 via a communication network.

Figure 5:
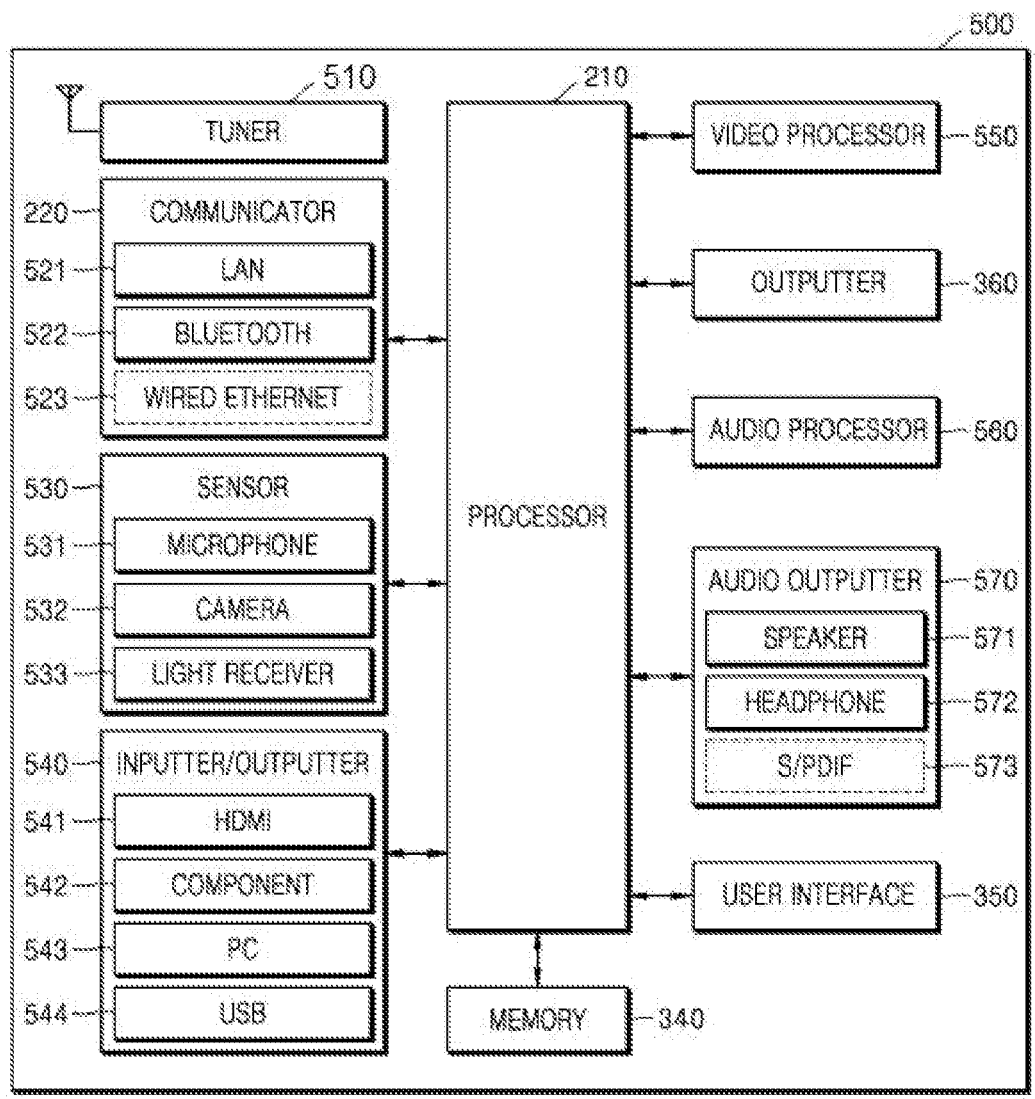
FIG. 5 is a block diagram illustrating a configuration of a mobile terminal according to an embodiment of the disclosure.

FIG. 5 is a block diagram illustrating a configuration of a mobile terminal according to an embodiment of the disclosure.

As illustrated in FIG. 5, a mobile terminal 500 may further include a tuner 510, a sensor 530, an inputter/outputter 540, a video processor 550, an audio processor 560, and an audio outputter 570 in addition to the processor 210, the communicator 220, the memory 340, the user interface 350, and the video outputter 360.

Detailed descriptions regarding the processor 210, the communicator 220, the memory 340, the user interface 350, and the video outputter 360 (which is substantially similar as the outputter 360 in FIG. 3) given above with reference to FIG. 2 or FIG. 3 will not be repeated.

The tuner 510 may select a frequency of a channel to be received by the mobile terminal 500 from various radio wave components by tuning via amplification, mixing, resonance, or the like, of broadcast content received in a wired or wireless manner. Content received via the tuner 510 may be separated into audio, video, and/or additional information by decoding (e.g., audio decoding, video decoding, or additional information decoding). The separated audio, video, and/or additional information may be stored in the memory 340 under the control of the processor 210.

The communicator 220 may connect the mobile terminal 500 to an external device (e.g., the display 110 or the display controller 120) under the control of the processor 210. The processor 210 may receive display identification information and an output control signal from the display 110 connected via the communicator 220. The communicator 220 may download or browse the web for programs or applications for generation of the adjustment signal according to the embodiment of the disclosure from an external server (not shown).

The communicator 220 may include wireless LAN 521, Bluetooth 522, and wired Ethernet 523 corresponding to performance and structure of the mobile terminal 500. The communicator 220 may also include a combination of the wireless LAN 521, the Bluetooth 522, and the wired Ethernet 523. The communicator 220 may receive a control signal via a control device (not shown) under the control of the processor 210. The control signal may be implemented as a Bluetooth signal type, an RF signal type, or a Wi-Fi type. The communicator 220 may further include any other short-distance communication (e.g., near field communication (NFC)(not shown), Bluetooth low energy (BLE)(not shown) in addition to the Bluetooth. According to an embodiment of the disclosure, the communicator 220 may be connected to the mobile terminal 500 via short-distance communication such as the Bluetooth 522 or BLE and transmit and receive a connecting signal.

The sensor 530 may detect input speech of the user, an image of the user, or an interaction with the user, and may include a microphone 531, a camera 532, and a light receiver 533. According to an embodiment of the disclosure, the image capturing device 230 of FIGS. 2 and 3 may correspond to the sensor 530 or the camera 532 of FIG. 5.

The microphone 531 receives an uttered speech of the user. The microphone 531 may convert the received speech into electric signals and output the converted signals to the processor 210. The microphone 531 according to an embodiment of the disclosure may detect user input information by receiving audio signals of the user input information from the user.

The camera 532 may include a sensor (not shown) and a lens (not shown) and may capture an image formed on a screen. According to an embodiment of the disclosure, the camera 532 may obtain an image of the display 110 by image capturing.

According to an embodiment of the disclosure, the camera 532 may determine whether an object to be captured satisfies image capture conditions, and capture the image based on a determination that the object satisfies the image capture conditions. The image capture conditions may be satisfied based on a distance or an angle between the mobile terminal 500 and the display 110, which is an object to be captured, satisfying pre-set values.

According to an embodiment of the disclosure, the camera 532 may output guide information on the screen such that the object is located at the center of the screen or the object is not tilted in both horizontal and vertical directions. The camera 532 may adjust exposure, aperture value, ISO, and the like, to locate the object to be captured within preset-ranges on the screen.

The light receiver 533 may receive an optical signal (including the control signal). The light receiver 533 may receive an optical signal corresponding to a user input (e.g., touch, press, touch gesture, speech, or motion) from a control device, such as a remote control and a mobile phone. The control signal may be extracted from the received optical signal under the control of the processor 210.

The inputter/outputter 540 may receive a video signal (e.g., a moving picture signal and still image signal), an audio signal (e.g., a speech signal and a music signal), and additional information (e.g., description or title of content and location where the content is stored), and the like, from an external server outside the mobile terminal 500 under the control of the processor 210. The inputter/outputter 540 may include at least one of a high-definition multimedia interface (HDMI) port 541, a component jack 542, a PC port 543, or a USB port 544. The inputter/outputter 540 may include a combination of the HDMI port 541, the component jack 542, the PC port 543, and the USB port 544.

The memory 340 according to an embodiment of the disclosure may store instructions and programs for processing and controlling by the processor 210. The memory 340 may store data input to the mobile terminal 500 or output from the mobile terminal 500. Also, the memory 340 may store information or data required for operations of the mobile terminal 500.

According to an embodiment of the disclosure, programs stored in the memory 340 may be classified into a plurality of modules according to functions thereof. The memory 340 may store one or more programs to adjust the image quality of the display 110 using the obtained image. The memory 340 may temporarily or non-temporarily store the image obtained by the camera 532. The memory 340 may store compensation functions, compensation programs, or compensation information used to compensate the obtained image.

The processor 210 controls the overall operation of the mobile terminal 500 and a signal flow among internal components of the mobile terminal 500 and processes data. When a user input is received or pre-set conditions are satisfied, the processor 210 may execute an operating system (OS) and various applications stored in the memory 340.

The processor 210 according to an embodiment of the disclosure may obtain an image of an object whose image quality is to be adjusted, and compensate the obtained image to adjust the image quality of the display that is the object by executing one or more instructions stored in the memory 340. According to an embodiment of the disclosure, a plurality of processors may be used. In this example, the function of compensating the image and the function of generating the adjustment signal to adjust the image quality of the display may be performed by separate processors.

Also, the processor 210 may include an internal memory (not shown). In this example, at least one of data, programs, or instructions stored in the memory 340 may be stored in the internal memory (not shown) of the processor 210.

The video processor 550 may process image data to be displayed by the video outputter 360 and perform various image processing operations for image data such as decoding, rendering, scaling, noise filtering, frame-rate conversion, and resolution conversion.

The video outputter 360 may display an image signal included in a content received via the tuner 510 under the control of the processor 210. Also, the video outputter 360 may display content (e.g., a moving image) input via the communicator 220 or the inputter/outputter 540. According to an embodiment of the disclosure, the video outputter 360 may output an image to be captured by the camera 532 and also output an image captured by the camera 532. The video outputter 360 may also output an image stored in the memory 340 under the control of the processor 210. According to an embodiment of the disclosure, the video outputter 360 may output guide information indicating a position where a capture image is to be located together with the image to be captured.

When the video outputter 360 is implemented with a touch screen, the video outputter 360 may also be used as an input device as well as an output device. For example, the video outputter 360 may include at least one of a liquid crystal display, a thin film transistor-liquid crystal display, an organic light-emitting diode, a flexible display, a 3D display, or an electrophoretic display. In addition, the mobile terminal 500 may include two or more video outputters 360 in accordance with a configuration of the the mobile terminal 500.

The audio processor 560 processes audio data. The audio processor 560 may perform various processing operations for audio data such as decoding, amplification, and noise filtering.

The audio outputter 570 may output audio included in the content received through the tuner 510, audio input via the communicator 220 or the inputter/outputter 540, and audio stored in the memory 340 under the control of the processor 210. The audio outputter 570 may include at least one of a speaker 571, a headphone output terminal 572, or a Sony/Philips digital interface (S/PDIF) output terminal 573.

The user interface 350 may include a component that is configured to input data allowing the user to control the mobile terminal 500. The user interface 350 may be implemented as a device to control the mobile terminal 500 such as a key pad. When the video outputter 360 is implemented as a touch screen, the user interface 350 may be replaced by a user's finger, an input pen, or the like. The user interface 350 may control functions of the mobile terminal 500 by using a sensor (not shown) capable of recognizing motion in addition to a key pad, a dome switch, a jog wheel, a jog switch, a button, and a touch pad included therein. Also, the user interface 350 may be a pointing device. For example, the user interface 350 may operate as the pointing device upon receiving an input of a particular key. In some examples, functions of the user interface 350 may be performed by the sensor 530. For example, the microphone 531 receiving a speech of the user may recognize a speech command of the user as a control signal.

The user may set an environment of the mobile terminal 500 via the user interface 350. Also, the user may input user input information through the user interface 350. The user input information may include at least one of an item to be adjusted, a reference value, adjustment unit information, or certain area identification information. In addition, the user input information may further include configuration information. The user may instruct generation of the adjustment signal according to an embodiment of the disclosure via the user interface 350. As a result, the mobile terminal 500 may start to capture an image and generate the adjustment signal using the captured image.

Meanwhile, the block diagrams of the mobile terminals 200, 300, and 500 illustrated in FIGS. 2, 3, and 5 are block diagrams according to the embodiment of the disclosure. The components illustrated in the block diagrams may be integrated, added, or omitted in accordance with specifications of a mobile terminal actually implemented in practice. For example, two or more components may be integrated into one component or one component may be separated into two or more components. Also, functions performed by each block are intended to explain embodiments of the disclosure, and specific operations or apparatuses mentioned herein are not intended to limit the scope of the disclosure.

Figure 6:
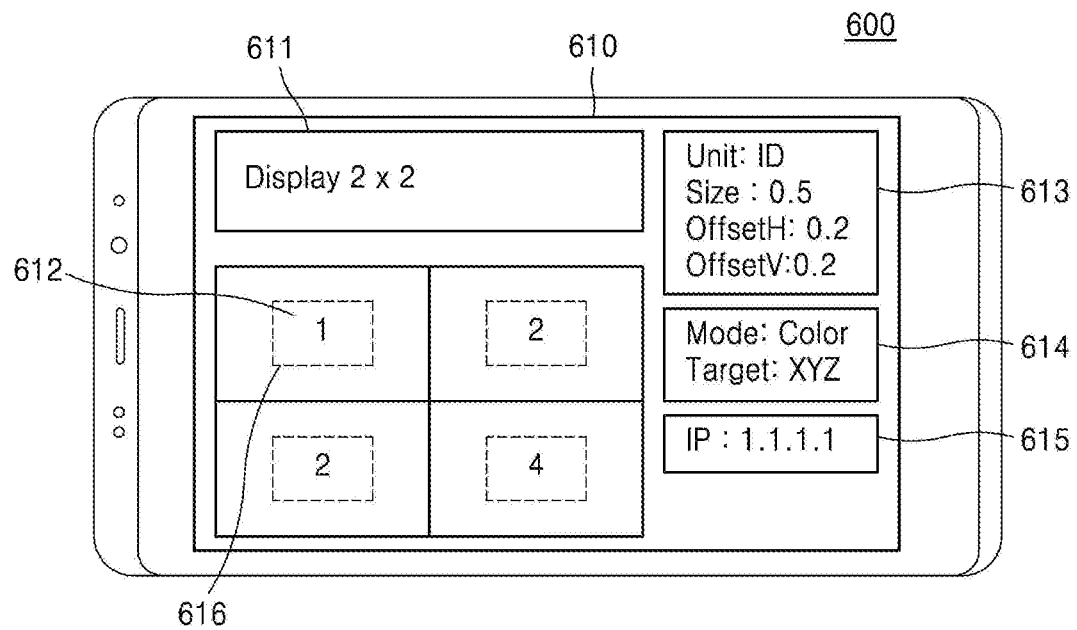
FIG. 6 is a diagram illustrating a screen via which user input information is input to a mobile terminal, according to an embodiment of the disclosure.

FIG. 6 is a diagram of a screen to input user input information to a mobile terminal according to an embodiment of the disclosure.

Referring to FIG. 6, the user may input information required for adjustment by using a mobile terminal 600. The mobile terminal 600 may output a screen 610 to receive an input of information required for adjustment from the user. The screen 610 to receive the input of information required for adjustment may include configuration information 611, ID information 612 assigned to the image split according to the adjustment unit, adjustment setting information 613 and 614 including an adjustment unit, certain area identification information, an item to be adjusted, and a reference value, and communication information 615. The screen of FIG. 6 is an example and the configuration of the screen to receive information required for adjustment or items to be input may be modified.

The configuration information 611 may be information for recognizing panels included in the display 110 for which image quality is to be measured. The mobile terminal 600 may recognize the number of panels included in the display 110 based on the configuration information 611. Because the user may directly recognize the number of panels included in the display 110 by looking at the display 110, the configuration information 611 may directly be input by the user via the mobile terminal 600. In FIG. 6, configuration information is expressed as 2×2 to indicate that the display 110 includes four panels 111, 112, 113, and 114 arranged in a matrix form.

According to an embodiment of the disclosure, the configuration information 611 may directly be received from the display 110 or the display controller 120.

The ID information 612 may be used to split the image into areas according to the adjustment unit, and display the split areas. The mobile terminal 600 may receive the adjustment unit from the user. The mobile terminal 600 may split the image into a plurality of areas according to the adjustment unit. The adjustment unit may be one display, i.e., a whole set of a plurality of panels, a subset of panels, a panel, a cabinet constituting the panel, a module constituting the cabinet, or pixels constituting the module. The user may set a desired adjustment unit, and the mobile terminal 600 may split the image into areas according to the adjustment unit input by the user and assign unique IDs to the split areas, respectively.

For example, an LED panel may include a set of a plurality of cabinets, each cabinet may include a set of a plurality of modules, and each module may include a plurality of pixels. Thus, to control the entire display including LED panels according to a cabinet, a module, or pixels which are smaller than the panel, the user may set the cabinet, the module, or the pixel as the adjustment unit and the mobile terminal 600 may generate an adjustment signal for each of the adjustment units. The display 110 may control an output of optical information of each adjustment unit according to the adjustment signal generated for each adjustment unit.

FIG. 6 illustrates an example in which the adjustment unit input by the user is a panel. The mobile terminal 600 may split the screen into four areas corresponding to respective panels, used as the adjustment unit, and assign IDs to the respective panels. The mobile terminal 600 may assign IDs to the four panels starting from the panel in the first column of the first row sequentially to the panel in the second column of the first row, the panel in the first column of the second row, and the panel in the second column of the second row. The mobile terminal 600 may assign IDs to the areas in a particular order according to the adjustment unit and communicate with the display 110 or the display controller 120 for matching of the order of assigning the IDs such that the display 110 or the display controller 120 recognizes the IDs of areas of the display 110 corresponding thereto in the same order.

The certain area identification information may be information to select an area of the display for which image quality is to be measured and adjusted. The mobile terminal 600 may recognize a certain area 616 from the entire display or the inside of the display in accordance with certain area identification information set by the user and measure the image quality of the certain area 616. Size included in the adjustment setting information 613 may refer to a size of the certain area 616 occupied in an area split according to the adjustment unit corresponding to each ID. "OffsetH" and "OffsetV" included in the adjustment setting information 613 may refer to how far away each certain area 616 is from in the horizontal and vertical directions in the adjustment unit, i.e., an offset value in the horizontal direction and an offset value in the vertical direction, respectively. The size and position of the certain area 616 may vary. The user may change the size and position of the certain area 616 via a key pad provided in the mobile terminal 600. Alternatively, when the mobile terminal 600 is implemented with a touch screen, the size and position of the certain area 616 may be adjusted by performing a touch gesture, such as a dragging gesture with a finger or an input pen, or the like. According to an embodiment of the disclosure, the certain area 616 may be positioned around a boundary portion of the adjustment units. The user may perform a touch gesture by dragging a finger to move the certain areas 616 to be closer to each other according to the adjustment unit. In general, people tend to see boundaries of respective panels. When the adjustment unit is the panel, the user may set an area around the boundary portion of a panel as the certain area 616, and measure and adjust the image quality of the boundary portion of the panel.

The adjustment setting information 614 may include an item to be adjusted and a reference value. The item to be adjusted may be information indicating one of items of optical information output from the display 110 to be adjusted. The item to be adjusted may be one item or a plurality of items selected from brightness, color, uniformity of brightness or color, gray level, gamma, and color space. Referring to FIG. 6, the item to be adjusted is color. The user may additionally change the item to be adjusted in addition to color and the mobile terminal 600 may generate an adjustment signal in accordance with the item to be adjusted set by the user. Therefore, the image quality of the display 110 may be adjusted according to various characteristics of optical information.

The reference value that is a target value of an image quality value may be an absolute value. The mobile terminal 100 may generate an adjustment signal using the reference value based on information required to change the measured image quality value to the reference value.

According to an embodiment of the disclosure, the adjustment setting information 614 may include information to select an absolute mode or a relative mode as a setting mode. The absolute mode refers to a mode to set a reference value desired by the user to a target value as described above, and the relative mode refers to a mode to set an image quality value of a display image corresponding to a predetermined ID to a reference value instead of the absolute value. When the user selects the relative mode as the setting mode, the user needs to input an ID number having the image quality value to be used as the reference value. Alternatively, when the image quality value of a certain area in an area corresponding to the predetermined ID is used as the reference value, the user needs to input position information to identify the ID number and the certain area as well.

The communication information 615 may be information to perform communications and may be access information to communicate with the display 110 or the display controller 120 via a wired or wireless communication network. For example, upon using the Wi-Fi as the communication method, the communication information 615 may be Internet protocol (IP) information of the display 110. Accordingly, the user may use the mobile terminal 600 to select the display 110 for which image quality is to be measured from various displays, access the display 110, measure the image quality, generate the adjustment signal, and transmit the adjustment signal to the display 110 in the field of actual practice.

Figure 7:
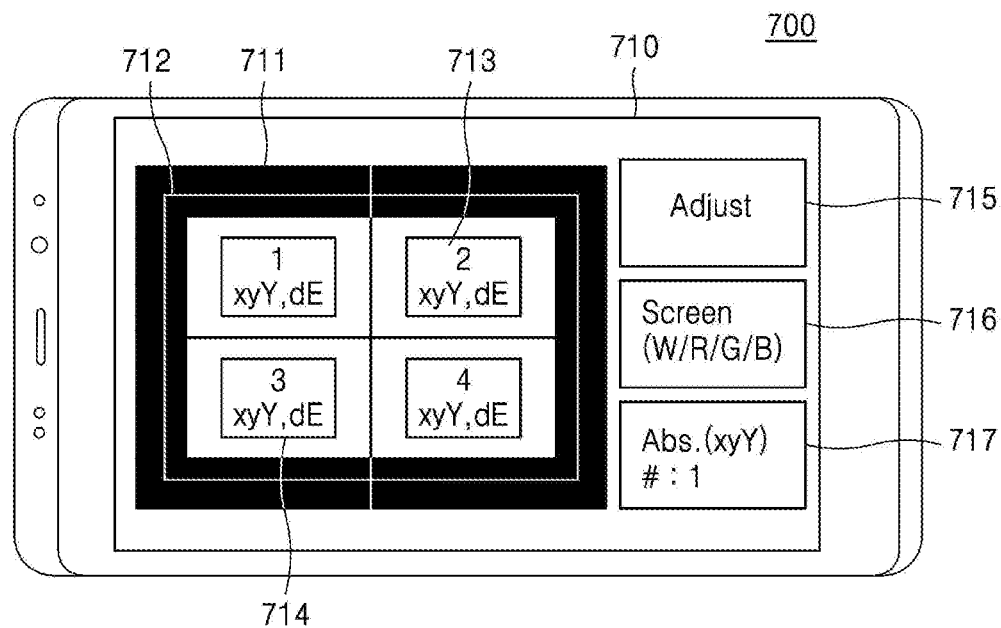
FIG. 7 is a diagram of a screen of a mobile terminal, wherein the screen is for measuring image quality, according to an embodiment of the disclosure.

FIG. 7 is a diagram of a screen of a mobile terminal for measuring image quality according to an embodiment of the disclosure.

Referring to FIG. 7, a mobile terminal 700 may output an image 711 to be captured on a screen 710. The screen 710 may include a guideline 712, ID information 713, certain area identification information 714, an adjust button 715, state displaying information 716, and adjustment setting information 717 in addition to the image 711. However, this is an example embodiment of the disclosure, and the screen of the mobile terminal may further include any other elements arranged differently.

The guideline 712 may be displayed on the image 711. The guideline 712 may be information to indicate lines where the image 711 needs to be positioned on the mobile terminal 700. The guideline 712 may include a line in which the entire display 110 needs to be positioned, and also include lines in which the plurality of panels included in the display 110 need to be positioned. Although FIG. 7 illustrates an example in which the configuration information is 2×2, the guideline 712 may include lines to split the display into nine display panels when the configuration information is 3×3.

The ID information 713 assigned to the respective areas of the image split into according to the adjustment unit may be displayed on the screen 710.

The screen 710 may include the certain area identification information 714. The certain area identification information 714 may be information to measure a certain area for which image quality is desired to be measured by the user. When the user inputs certain area identification information via the adjustment setting information 613 shown in FIG. 6, the mobile terminal 700 may display the area corresponding thereto on the screen 710.

The adjust button 715 may be a control button to allow the user to generate an adjustment signal from the image 711 according to an embodiment of the disclosure. When the user selects the adjust button 715, the mobile terminal 700 captures the image 711 output via the screen 710, measures an image quality value of a certain area identified based on the certain area identification information 714, and outputs the measured image quality value in the ID information 713. In FIG. 7, "xyY, dE" displayed in the certain area identification information 714 indicates the measured image quality value.

The state displaying information 716 may be information indicating a pattern of the display 110, as an object to be captured, being displayed. The display 110 may output optical information by outputting an image quality measurement pattern. The mobile terminal 700 may automatically recognize the image quality measurement pattern and select an item to be adjusted according to the image quality measurement pattern.

According to an embodiment of the disclosure, when the display 110 outputs a bright white pattern as the image quality measurement pattern, the mobile terminal 700 may recognize that an item to be measured is brightness, and may measure brightness among the image quality values of the image 711.

According to an embodiment of the disclosure, the mobile terminal 700 may receive the item to be adjusted selected by the user as illustrated in FIG. 6, and display the selected item to be adjusted as the state displaying information 716.

The user may select the absolute mode or the relative mode as the setting mode by using the adjustment setting information 614 of FIG. 6. The adjustment setting information 717 of FIG. 7 may be information indicating a mode selected by the user via the adjustment setting information 614. Referring to FIG. 7, when the user selects the absolute mode, the reference value is output to the adjustment setting information 717. Also, the "#" included in the adjustment setting information 717 may be information indicating the number of measuring the image quality.

The user may easily recognize at a glance the certain area for which image quality is to be measured, the measured image quality value, the item being adjusted, the reference value, and the like, by using information output on the screen 710 of the mobile terminal 700.

The mobile terminal 700 may generate the adjustment signal using information required to change the measured image quality value to the reference value, and transmit the generated adjustment signal to the display 110.

Figure 8:
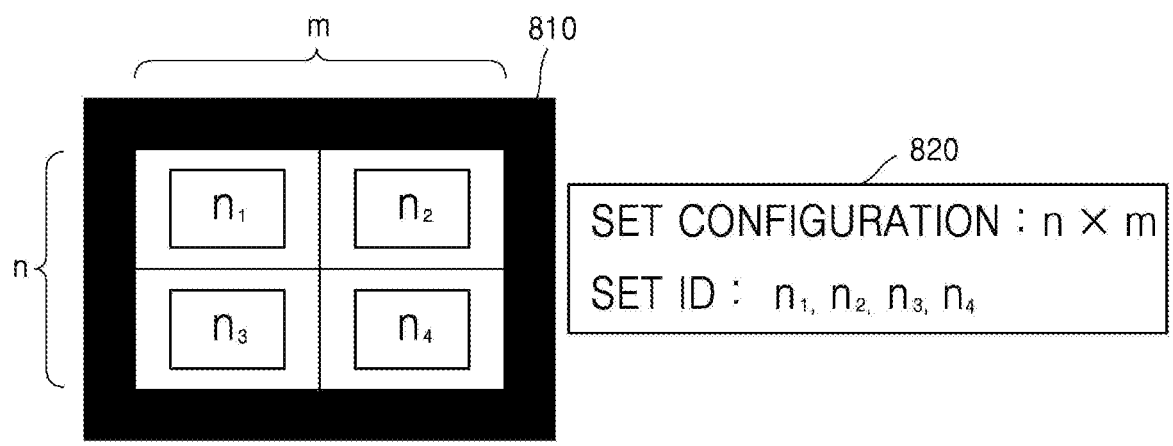
FIG. 8 is a diagram for describing a method of assigning identifiers (IDs) to an image performed by a mobile terminal, according to an embodiment of the disclosure.

FIG. 8 is a diagram for describing a method of assigning IDs to an image performed by a mobile terminal according to an embodiment of the disclosure. Referring to FIG. 8, the mobile terminal 200 may split the image into areas according to the adjustment unit included in the user input information. The mobile terminal 200 may assign IDs to the split areas of the image, respectively.

The mobile terminal 200 may split the image into areas according to the adjustment unit, and assign IDs to the split areas of the image, respectively, by communicating with and receiving information from the display 110 or the display controller 120.

The mobile terminal 200 may output an image via the screen 810. According to an embodiment of the disclosure, it is assumed that the image to be captured is a large-sized LED display. To adjust the image quality of one large-sized display according to a cabinet, the user may set a cabinet as the adjustment unit in the user input information. In accordance with the user's selection, the mobile terminal 200 may output the image of one display on a screen 810 and display the image split into areas corresponding to four cabinets, which are units of adjustment selected by the user. The mobile terminal 200 may assign IDs to respective cabinets.

For example, the mobile terminal 200 may split the screen 810 into four areas corresponding to respective cabinets, and assign IDs to the respective areas corresponding to the cabinets starting from the cabinet in the first column of the first row sequentially to the cabinet in the second column of the first row, the cabinet in the first column of the second row, and the cabinet in the second column of the second row. Similarly, when the adjustment unit input by the user is a pixel, the mobile terminal 200 may split the screen 810 into areas corresponding to n×m pixels and assign IDs to respective areas corresponding to the pixels. That is, a method of splitting the display image into n rows and m columns and matching the sequentially input n1, n2, n3, and the like to the rows and columns from an upper row may be used.

The mobile terminal 200 may generate information 820 indicating the number of split areas of the screen 810 and the number of adjustment units included in the screen 810, and output the generated information 820 via a display of the mobile terminal 200, or transmit the generated information 820 to the display 110 or the display controller 120 configured to measure the image quality. According to an embodiment of the disclosure, the mobile terminal 200 may transmit information indicating the order of assigning IDs to the respective areas of the image of the screen 810 to the display 110. The display 110 or the display controller 120 may identify an area of the display 110 corresponding to a selected ID by communicating with the mobile terminal 200, and matching the area to configuration information of the display 110 and adjust the image quality of the area corresponding to the selected ID.

Figure 9:
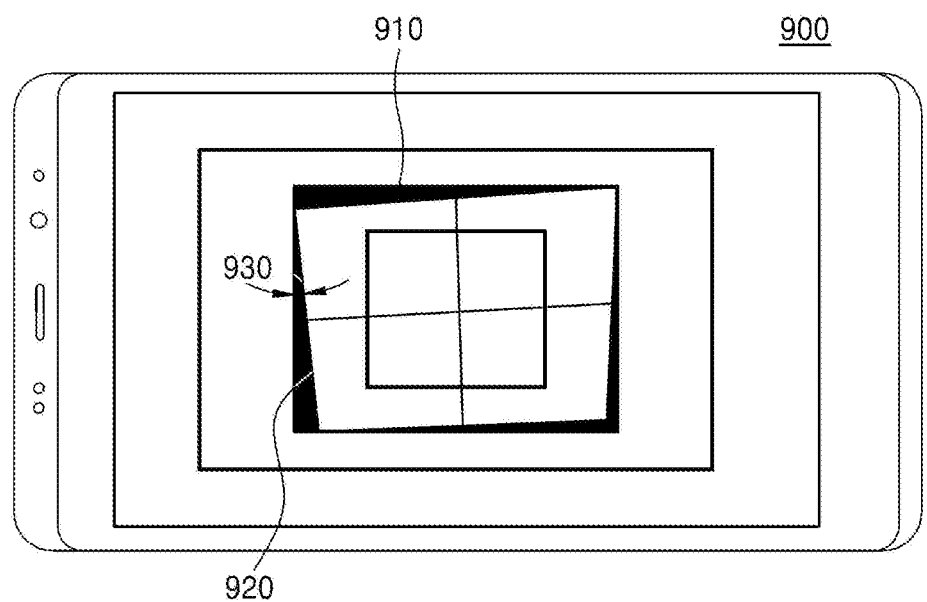
FIG. 9 is a diagram for describing a mobile terminal capturing an image in accordance with image capture conditions, according to an embodiment of the disclosure.

FIG. 9 is a diagram for describing a mobile terminal capturing an image in accordance with image capture conditions according to an embodiment of the disclosure.

Referring to FIG. 9, a mobile terminal 900 may output an image 920 of a display to be captured on a screen 910. The mobile terminal 900 may determine whether the image 920 to be captured satisfies image capture conditions. The image capture conditions may include a distance between the mobile terminal 900 and the display to be captured and an angle between the mobile terminal 900 and the display.

According to an embodiment of the disclosure, the mobile terminal 900 may extract boundary position information of the display from the image 920, calculate a distance between the display and the mobile terminal 900 based on a ratio of the display, and calculate a capture angle of the camera based on angle information of each corner of the display image. The mobile terminal 900 may determine whether a current image capture state satisfies a threshold via comparison with image capture conditions defined as image capturing guidelines and input thereto. When the current image capture state does not satisfy the threshold, a fail alarm is output to the screen 910 and a recapturing process may be induced.

According to an embodiment of the disclosure, the mobile terminal 900 may display a guideline for a position of the image 920 on the screen 910 together with an image currently viewed on the screen 910 allowing the user to adjust the current image for capturing.

According to an embodiment of the disclosure, when the display to be captured is positioned at the center of the screen 910, the mobile terminal 900 may extract an area of the display and adjust exposure, aperture value, ISO, and the like. The mobile terminal 900 may display a correct position for capturing as a reference rectangular line to prevent the image 920 from tilting in the vertical or horizontal direction, and capture the image 920 based on a determination that a difference between the rectangular line and the actually captured image 920, i.e., an angular difference 930 of a quadrant is less than a predetermined angle.

After appropriately capturing the image 920, the mobile terminal 900 may extract an area of the display that requires adjustment. According to an embodiment of the disclosure, the mobile terminal 900 may extract a central portion of the display from areas of the display not to be influenced by uniformity characteristics.

According to another embodiment of the disclosure, the mobile terminal 900 may receive an input of a certain area selected by the user, and measure an image quality value of the area selected by the user. According to an embodiment of the disclosure, when the mobile terminal 900 compensates the image according to characteristics of the camera, there is no need to consider uniformity, and thus the mobile terminal 900 may measure the image quality of a certain area selected by the user instead of the image quality of the central portion.

Figure 10:
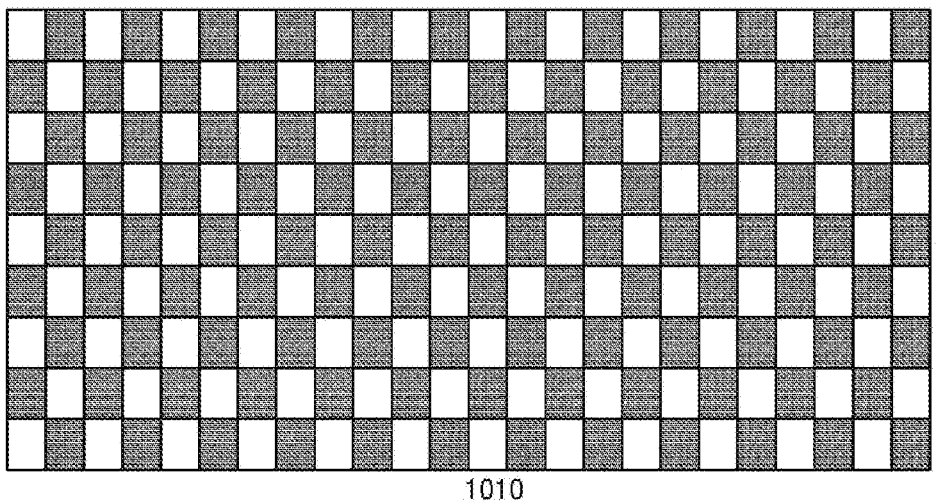
FIG. 10 is a diagram illustrating an image quality measurement pattern output by a display, according to an embodiment of the disclosure.
Figure 10:
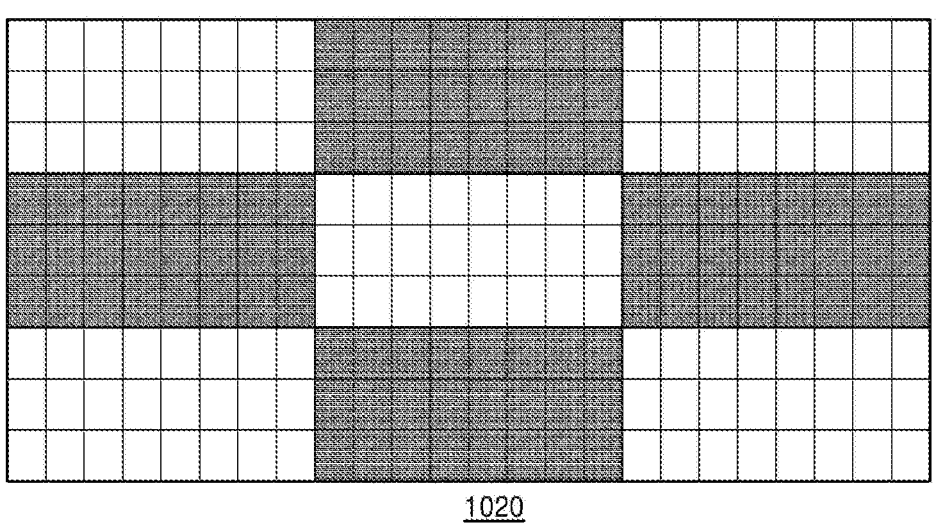
Figure 10:
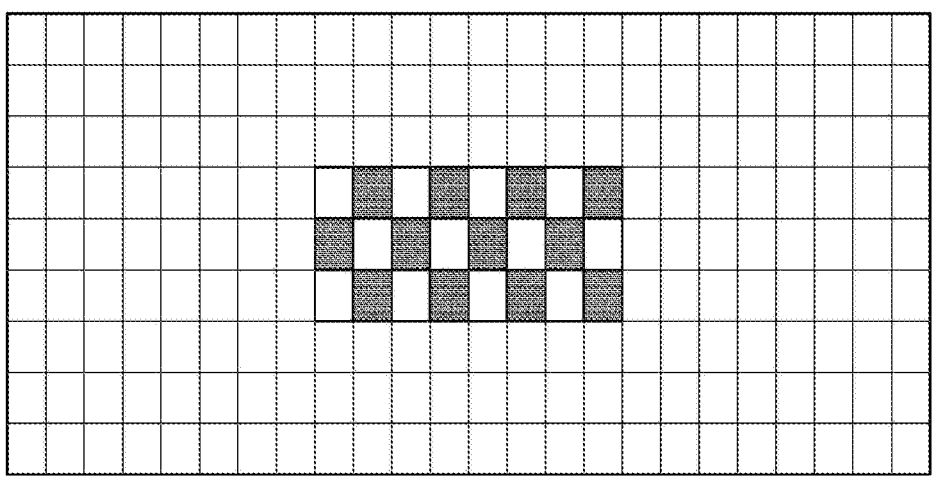

FIG. 10 is a diagram illustrating an image quality measurement pattern output by the display according to an embodiment of the disclosure.

Referring to FIG. 10, the display 110 may output various image quality measurement patterns 1010, 1020, and 1030. However, the image quality measurement patterns 1010, 1020, and 1030 shown in FIG. 10 are only examples, and any other various image quality measurement patterns may also be applied.

The item to be adjusted by the mobile terminal 200 may vary according to the image quality measurement pattern output from the display 110.

For example, when the display 110 outputs a bright white pattern, the mobile terminal 200 may measure brightness among the items of the optical information output from the display 110. Alternatively, according to another embodiment of the disclosure, the mobile terminal 200 may request the display 110 or the display controller 120 to output a predetermined image quality measurement pattern by the display 110 to measure the image quality of a certain item to be adjusted. When the item to be adjusted requested by the user is color, the display 110 may output an R/G/B/Y/M/C screen. Alternatively, when the item to be adjusted requested by the user is gamma, the display 110 may sequentially output image quality measurement patterns having various gray levels from a dark black level to a bright white level at regular intervals or predetermined time intervals.

The mobile terminal 200 may capture an image of the display 110 outputting the image quality measurement pattern and recognize boundaries of panels according to a pattern included in the image quality measurement pattern. According to an embodiment of the disclosure, the mobile terminal 200 may automatically split the image according to the boundary and assign IDs to the split areas, respectively. In general, boundaries of panels of a video wall are clearly visible due to bezels of panels included in the video wall and the video wall may be seen as separated portions of the respective panels. However, when the display includes LED panels not including bezels, it may be difficult to recognize the LED panels separately. Thus, when the display 110 outputs various image quality measurement patterns, the user or the mobile terminal 200 may recognize boundaries of patterns included in the image quality measurement patterns and set a module or a cabinet as the adjustment unit using the boundaries. The mobile terminal 200 may measure the image quality of each module or each cabinet that is the adjustment unit and measure the image quality of an identified certain area by identifying the certain area therefrom.

Figure 11:
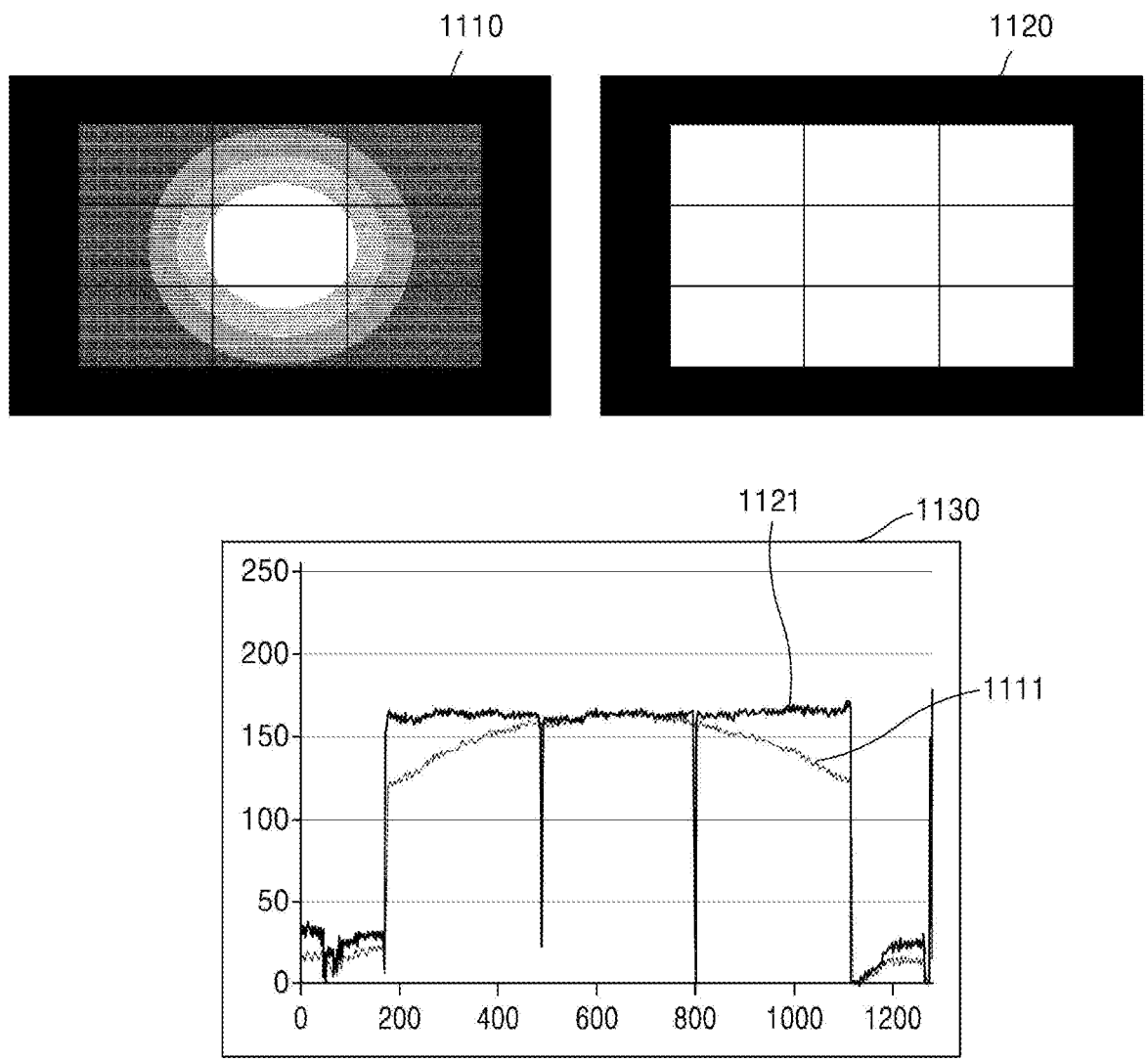
FIG. 11 is a view illustrating image compensation performed by a mobile terminal, according to an embodiment of the disclosure.

FIG. 11 is a view illustrating image compensation performed by a mobile terminal according to an embodiment of the disclosure. Referring to FIG. 11, the mobile terminal 200 may compensate for distribution information of a captured image 1110 to obtain a compensated image 1120. In FIG. 11, the left image 1110 is a captured image, and the right image 1120 is an image compensated by the mobile terminal 200 using a distribution information compensation function.

According to an embodiment of the disclosure, the image obtained by the mobile terminal 200 by capturing the display 110 may be converted into a measurement information image expressed with brightness and color coordinates via a compensation algorithm. The compensation algorithm performed by the mobile terminal 200 may include at least one function selected from a brightness information compensation function, a color information compensation function, a gamma characteristic compensation function, and a distribution information compensation function depending on the purpose.

The brightness information compensation function is a function to compensate for an amount of light output from the display 110 and arriving at the sensor in the camera of the mobile terminal 200 and response characteristics of the sensor of the camera.

The color information compensation function is a function to compensate for response characteristics of Red, Green, and Blue pixel values of the sensor of the camera to colors output from the display 110.

The distribution information compensation function is a function to compensate for a vignetting effect of the lens of the camera and non-uniformity of brightness distribution in an image caused by viewing angle characteristics of a display. When recognizing the mobile terminal 100 that is a large-sized light source, the camera may recognize light of a closer or orthogonal portion to the display 110 as being brighter, and recognize light of a farther or inclined portion as being darker or a different color. In this case, in the image captured by the mobile terminal 200, an inner portion is brighter and an outer portion is darker as shown in the left image 1110. Thus, the mobile terminal 200 may compensate for non-uniformity of the brightness by using the distribution information compensation function. When the mobile terminal 200 performs distribution information compensation, the left image 1110 may be compensated to an image having a uniform brightness without brightness difference between the inner portion and the outer portion as shown in the right image 1120.

A graph 1130 of FIG. 11 shows brightness of lateral cross-sections of the left image 1110 and the right image 1120. In the graph 1130, brightness 1111 of the cross-section of the left image 1110 is considerably different between a central portion and edge portions. According to an embodiment of the disclosure, because the mobile terminal 200 compensates for distribution information of the left image 1110, brightness 1121 of the cross-section of the right image 1120 is uniform regardless of portions of the image in the graph 1130.

FIG. 12 is a flowchart for describing a method of adjusting image quality of a display performed by a mobile terminal according to an embodiment of the disclosure. Referring to FIG. 12, the mobile terminal 200 may obtain an image of a display (1210). To measure the image quality, the display 110 may output an image quality measurement pattern, and the mobile terminal 200 may capture the display outputting the image quality measurement pattern to obtain the image. The mobile terminal 200 may determine whether the image satisfies image capture conditions before capturing the image, and then capture the image based on a determination that the image satisfies the image capture conditions.

The mobile terminal 200 may receive user input information (1220). The user input information may include adjustment unit information, certain area identification information, an item to be adjusted, or a reference value. According to an embodiment of the disclosure, the user input information may further include configuration information and communication information.

The mobile terminal 200 may compensate the obtained image (1230). Although FIG. 12 illustrates that the image is compensated after the user input information is received in stages, the compensating of the image may be performed by the mobile terminal 200 before the user input information is received, or receiving of the user input information and compensating of the image may be performed simultaneously.

The mobile terminal 200 performs compensation for characteristics of the lens or the sensor of the camera of the mobile terminal 200 recognizing light-emission characteristics of the display 110. To perform compensation, the mobile terminal 200 may compensate the image by directly performing a compensation algorithm or by receiving compensation information to compensate for response characteristics according to models of cameras of various mobile terminals respectively matched to light-emission characteristics according to models of displays from a memory or an external server and compensating the image using the compensation information.

The mobile terminal 200 may obtain an XYZ image by compensating for at least one of color information, brightness characteristics, gamma characteristics, or distribution characteristics of an obtained RGB image. The mobile terminal 200 may identify a certain area of the image according to the user input information after performing the compensation.

The mobile terminal 200 may measure an image quality value of the image at a position desired by the user (1240). The position desired by the user may be selected according to the adjustment unit or the certain area in accordance with user input information input by the user. The mobile terminal 200 may obtain a position of an area whose image quality value is desired to be measured by the user using the user input information and measure the image quality value of the position.

The mobile terminal 200 may measure the image quality value of the item to be adjusted desired by the user. For example, the mobile terminal 200 may receive an input of the item to be adjusted selected by the user among various items of optical information output from the display 110, such as brightness, color, gray level, gamma, color space, or uniformity of brightness or color, and measure the image quality value of the item to be adjusted.

The mobile terminal 200 may determine whether a difference between the measured image quality value and the reference value satisfies a threshold by comparing the measured image quality value with the reference value (1250). The reference value may be an absolute value set by the user or an image quality value of a different area of the display 110.

Based on determining that the difference between the two values does not satisfy the threshold, the mobile terminal 200 may wait for different input information, such as a modified item to be adjusted or a modified reference value, from the user.

Based on determining that the difference between the two values satisfies the threshold, the mobile terminal 200 may determine that adjustment is required. Based on determining that the difference between the two values is greater than the threshold, the mobile terminal 200 may obtain an output control signal from the display 110 (1260). The output control signal may be a signal to allow the display 110 to control output of optical information. The mobile terminal 200 may generate an adjustment signal by using the output control signal (1270). The adjustment signal is a signal to adjust the output control signal to increase or decrease the output control signal.

The mobile terminal 200 may transmit the adjustment signal to the display 110 (1280). When the user input information includes communication information, the mobile terminal 200 may transmit the adjustment signal by communicating with the display 110 using the communication information.

According to an embodiment of the disclosure, when the display 110 is controlled by a separate display controller 120, the mobile terminal 200 may transmit the adjustment signal to the display controller 120.

The display 110 or the display controller 120 may adjust the output control signal using the adjustment signal received from the mobile terminal 200 and control output of light by using the adjusted output control signal.

FIG. 13 is a flowchart for describing a method of generating an adjustment signal using user input information performed by a mobile terminal according to an embodiment of the disclosure.

Referring to FIG. 13, the mobile terminal 200 may receive user input information from the user. The user input information may include at least one of adjustment unit information, certain area identification information, an item to be adjusted, or a reference value.

The mobile terminal 200 may split the image into areas according to the adjustment unit based on the adjustment unit information included in user input information and assign IDs to respective split areas (1310).

The mobile terminal 200 may identify a certain area whose image quality is to be measured using certain area identification information included in user input information (1320).

The mobile terminal 200 may identify an item to be adjusted by using the item to be adjusted included in user input information (1330). According to an embodiment of the disclosure, the mobile terminal 200 may directly identify the item to be adjusted by measuring according to an image quality measurement pattern output from the display 110.

In a compensated image, the mobile terminal 200 may measure an item to be adjusted in the identified certain area, and obtain an image quality value of the item to be adjusted (1340).

The mobile terminal 200 may compare the measured image quality value with the reference value using the reference value included in user input information, and determine whether a difference between the image quality value and the reference value satisfies a threshold (1350).

Based on determining that the difference between the two values does not satisfy the threshold, the mobile terminal 200 may wait for different input information, such as a modified item to be adjusted or a modified reference value, from the user.

Based on determining that the difference between the two values satisfies (e.g., is greater than) the threshold, the mobile terminal 200 may generate an adjustment signal (1360).

As described above, the mobile terminal according to an embodiment of the disclosure may adjust the image quality of the display more accurately by compensating the image using response characteristics of the camera of the mobile terminal.

The mobile terminal according to an embodiment of the disclosure may adjust the image quality of the display to a desired value by using the absolute value selected by the user as the reference value.

The mobile terminal according to an embodiment of the disclosure may adjust various items of optical information in addition to brightness and color.

The mobile terminal according to an embodiment of the disclosure may adjust the image quality of the display for each adjustment unit desired by the user.

The mobile terminal and the method of operating the same according to an embodiment of the disclosure may be implemented in the form of a recording medium including instructions executable by a computer such as a program module. A computer-readable recording medium may include any usable medium that may be accessed by computers, volatile and non-volatile medium, and detachable and non-detachable medium. Also, the computer-readable recording medium may include a computer storage medium and a communication medium. The computer storage medium includes all volatile and non-volatile media, and detachable and non-detachable media which are technically implemented to store information including computer-readable instructions, data structures, program modules, or other data. The communication medium includes computer-readable instructions, a data structure, a program module, other data as modulation-type data signals such as carrier signals, or other transmission mechanism, and includes other information transmission media.

In addition, throughout the specification, the term "unit" may be a hardware component such as a processor or a circuit and/or a software component executed by the hardware such as the processor.

Furthermore, the mobile terminal and the method of operating the same according to an embodiment of the disclosure may be implemented in a computer program product including a non-transitory computer-readable medium having recorded thereon a program for obtaining a sentence in a multi lingual, obtaining vector values corresponding to each words included in the sentence by using a multi lingual translation model, converting the obtained vector values to vector values corresponding to a target language, and obtaining a sentence in the target language based on the converted vector values.

The above description of the disclosure is provided for the purpose of illustration, and it should be understood by those skilled in the art that various changes and modifications may be made without changing technical conception and features of the disclosure. Thus, it is clear that the above-described illustrative embodiments of the disclosure are illustrative in all aspects and do not limit the disclosure. For example, each component described to be of a single type may be implemented in a distributed manner. Likewise, components described to be distributed may be implemented in a combined manner.

What is claimed is:

1. A mobile terminal, comprising:
   a communicator configured to communicate with a display, the display comprising a plurality of panels and being configured to output optical information;
   an image capturing device configured to obtain an image of the display; and
   a processor configured to compensate the obtained image using a response characteristic of the image capturing device to compensate for the response characteristic of the image capturing device, and generate, using the compensated image, an adjustment signal to adjust the output of the optical information,
   wherein the communicator is further configured to transmit the adjustment signal to the display to permit the display to adjust the output of the optical information,
   wherein the response characteristic of the image capturing device corresponds to a characteristic that the image capturing device recognizes the optical information.

2. The mobile terminal of claim 1, wherein the response characteristic of the image capturing device comprises at least one of a brightness characteristic, a color characteristic, a gamma characteristic, or a distribution characteristic.

3. The mobile terminal of claim 1, wherein the obtained image is a red, green, blue (RGB) image and the compensated image is an XYZ image.

4. The mobile terminal of claim 1, wherein the response characteristic of the image capturing device is a characteristic of a camera, included in the image capturing device, configured to recognize a light-emission characteristic of the display.

5. The mobile terminal of claim 1, further comprising:
   a memory configured to store information in which light-emission characteristics of models of displays are mapped to response characteristics of models of image capturing devices of mobile terminals,
   wherein the processor is further configured to obtain information indicating the response characteristic of the image capturing device of the mobile terminal that is mapped to a light-emission characteristic of the display from the memory by identifying a model of the display and a model of the mobile terminal, and compensate the obtained image using the obtained information.

6. The mobile terminal of claim 1, wherein the processor is further configured to obtain an image quality value of the compensated image, and generate the adjustment signal using information required to adjust the image quality value to a reference value.

7. The mobile terminal of claim 6, further comprising a user interface configured to receive user input information, wherein the reference value is an absolute value included in the user input information.

8. The mobile terminal of claim 6, further comprising a user interface configured to receive user input information,
   wherein the processor is further configured to split the compensated image into a plurality of adjustment unit areas based on adjustment unit information included in the user input information, sequentially assign identifiers (IDs) to the respective split adjustment unit areas, and generate the adjustment signal for each area of the display corresponding to each of the split adjustment unit areas of the compensated image to which the IDs are respectively assigned.

9. The mobile terminal of claim 8, wherein the plurality of adjustment unit areas are a set of the plurality of panels included in the display, a panel, a cabinet constituting the panel, a module constituting the cabinet, or pixels constituting the module.

10. The mobile terminal of claim 8, wherein the processor is further configured to identify a certain area in each split adjustment unit area using identification information included in the user input information, and obtain an image quality value of the identified certain area, and
the adjustment signal comprises an ID of each split adjustment unit area comprising the identified certain area, and further comprises a position of the certain area.

11. The mobile terminal of claim 1, wherein the communicator is further configured to receive an output control signal from the display, and
the processor is further configured to generate the adjustment signal using the output control signal.

12. The mobile terminal of claim 1, wherein the adjustment signal comprises information indicating an item to be adjusted among brightness, color, uniformity of brightness or color, gray level, gamma, and color space of the optical information output by the display.

13. The mobile terminal of claim 12, wherein the display outputs the optical information by outputting an image quality measurement pattern, and the image quality measurement pattern varies according to the item to be adjusted.

14. The mobile terminal of claim 1, wherein the image capturing device is configured to determine whether the image satisfies an image capture condition, and obtain the image based on a determination that the image satisfies the image capture condition.

15. A method, performed by a mobile terminal, of controlling a display, the method comprising:
obtaining an image of the display, the display comprising a plurality of panels and being configured to output optical information;
compensating the obtained image to compensate for a response characteristic of an image capturing device of the mobile terminal;
generating, using the compensated image, an adjustment signal to adjust the output of the optical information; and
transmitting the adjustment signal to the display to permit the display to adjust the output of the optical information,
wherein the response characteristic of the image capturing device corresponds to a characteristic that the image capturing device recognizes the optical information.

16. The method of claim 15, wherein the compensating of the obtained image comprises compensating at least one of a brightness characteristic, a color characteristic, a gamma characteristic, or a distribution characteristic of the obtained image using a response characteristic of the image capturing device of the mobile terminal.

17. The method of claim 15, further comprising:
receiving a user input of a reference value; and
obtaining an image quality value of the compensated image,
wherein the generating of the adjustment signal comprises:
generating the adjustment signal using information required to adjust the image quality value to the reference value.

18. The method of claim 15, further comprising:
receiving a user input of adjustment unit information;
splitting the compensated image into a plurality of adjustment unit areas, based on the adjustment unit information;
assigning identifiers (IDs) to the respective split adjustment unit areas;
wherein the generating of an adjustment signal comprises
generating the adjustment signal for each of the split adjustment unit areas to which the identifiers are respectively assigned.

19. The method of claim 18, wherein the plurality of adjustment unit areas are a set of the plurality of panels included in the display, a panel, a cabinet constituting the panel, a module constituting the cabinet, or pixels constituting the module.

20. A non-transitory computer-readable recording medium having recorded thereon a program for executing a method, performed by a mobile terminal, of controlling a display, the method comprising:
obtaining an image of the display, the display comprising a plurality of panels and being configured to output optical information;
compensating the obtained image to compensate for a response characteristic of an image capturing device of the mobile terminal;
generating, using the compensated image, an adjustment signal to adjust the output of the optical information; and
transmitting the adjustment signal to the display to permit the display to adjust the output of the optical information,
wherein the response characteristic of the image capturing device corresponds to a characteristic that the image capturing device recognizes the optical information.

* * * * *